United States Patent [19]

Becker

[11] Patent Number: 5,064,048
[45] Date of Patent: Nov. 12, 1991

[54] BOARD CONVEYOR
[75] Inventor: Mark H. Becker, Vista, Calif.
[73] Assignee: Doorway Mfg. Co., Vista, Calif.
[21] Appl. No.: 531,018
[22] Filed: May 31, 1990

Related U.S. Application Data

[63] Continuation-in-part of Ser. No. 476,177, Feb. 7, 1990.
[51] Int. Cl.⁵ .............................................. B65G 17/08
[52] U.S. Cl. .................................. 198/345.1; 29/563; 83/423; 408/70
[58] Field of Search .................. 29/338, 563, 558; 83/133, 23, 423, 618, 620; 144/3 R, 3 E, 93 R, 353, 365, 367; 409/225; 198/345.1, 345.2, 345.3, 456; 408/1 R, 30, 39, 44, 70

[56] References Cited

U.S. PATENT DOCUMENTS

| | | | |
|---|---|---|---|
| 1,318,023 | 10/1919 | Stevenson | 83/133 |
| 3,547,171 | 12/1970 | Jacumin | 144/325 |
| 3,918,825 | 11/1975 | Alberti | 408/43 |
| 3,979,985 | 9/1976 | Daniels | 83/410 |
| 4,090,287 | 5/1978 | Selander | 29/568 |
| 4,132,253 | 1/1979 | Mills | 144/133 |
| 4,243,081 | 1/1981 | Pritelli | 144/3 A |
| 4,682,401 | 7/1987 | Tadashi et al. | 29/568 |
| 4,691,684 | 9/1987 | Negron-Cresop | 125/3 |
| 4,694,871 | 9/1987 | Jenkner | 144/35 R |

Primary Examiner—Z. R. Bilinsky
Attorney, Agent, or Firm—Dressler, Goldsmith, Shore, Sutker & Milnamow, Ltd.

[57] ABSTRACT

A conveyor for conveying a board into a zone wherein it is desirable to register the board in a longitudinal sense. A mechanism for conveying the board comprises two endless conveying elements spaced transversely, each mounting an endless series of pads. The board fits between two pads behind it and two pads ahead of it. A mechanism for registering the board comprises two elements spaced tranversely and arranged to be normally removed from and selectively insertable into the path of the board. In different arrangements, the elements are vertically insertable from above such path and pivotally biased, vertically insertable from below and longitudinally biased, or rotatably insertable from below and rotatably biased.

7 Claims, 12 Drawing Sheets

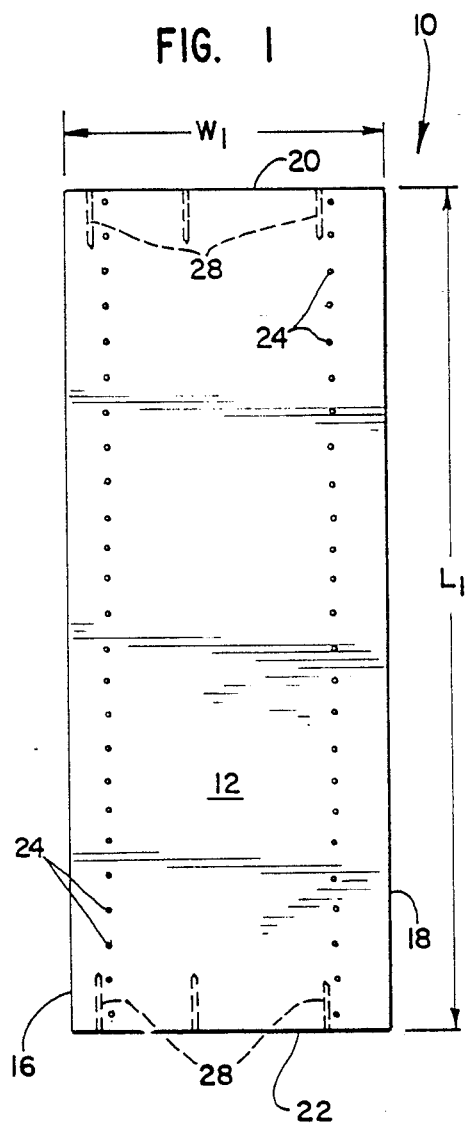
FIG. 1
FIG. 2
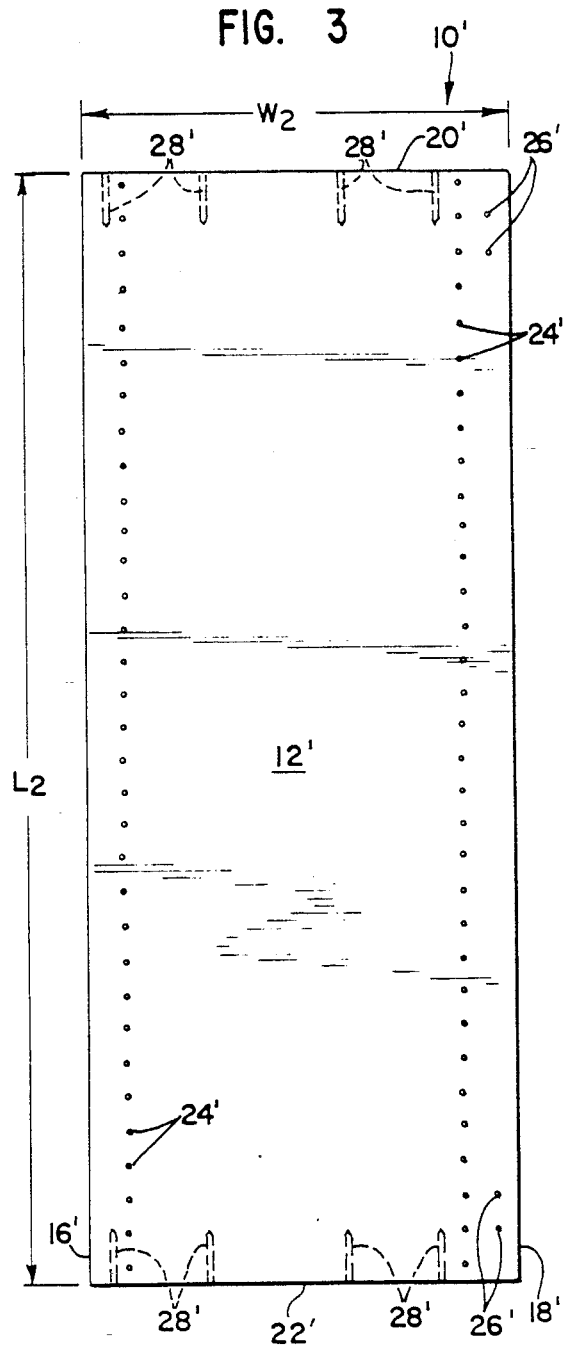
FIG. 3
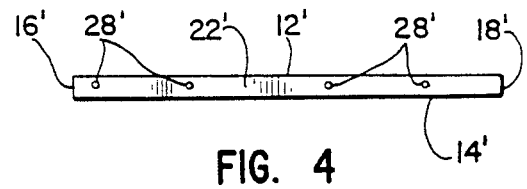
FIG. 4

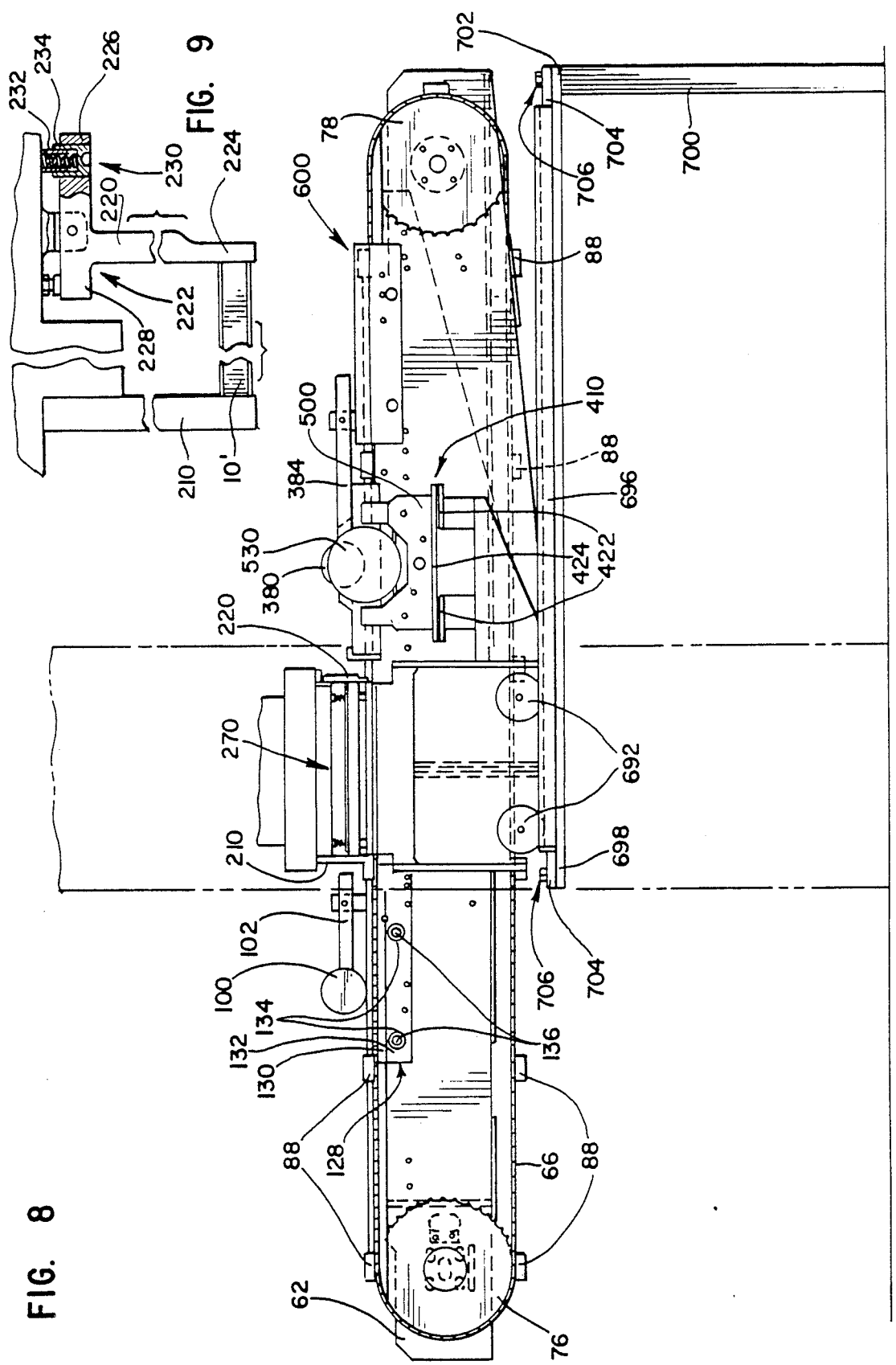

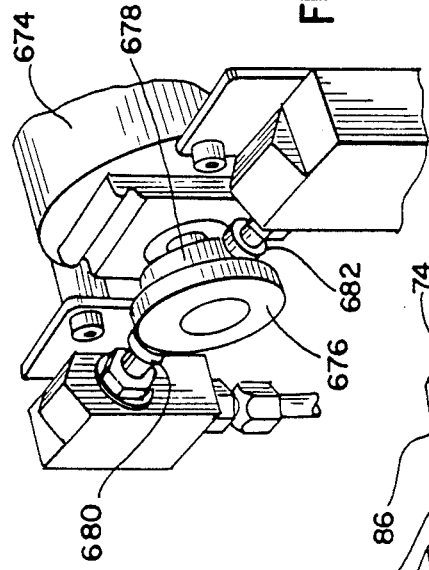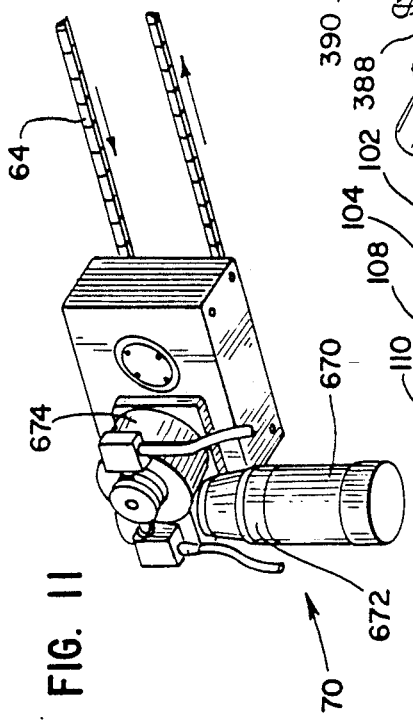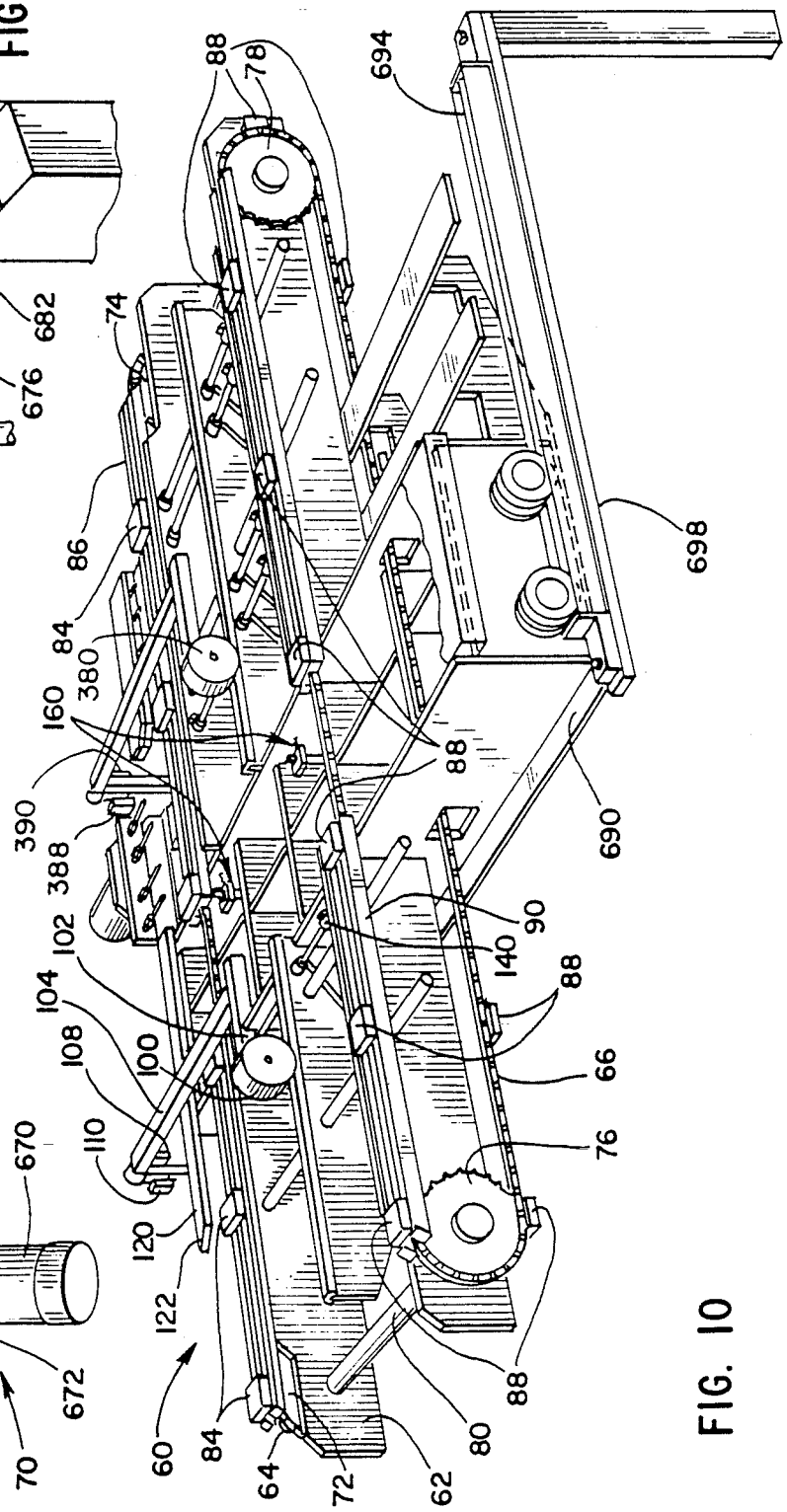

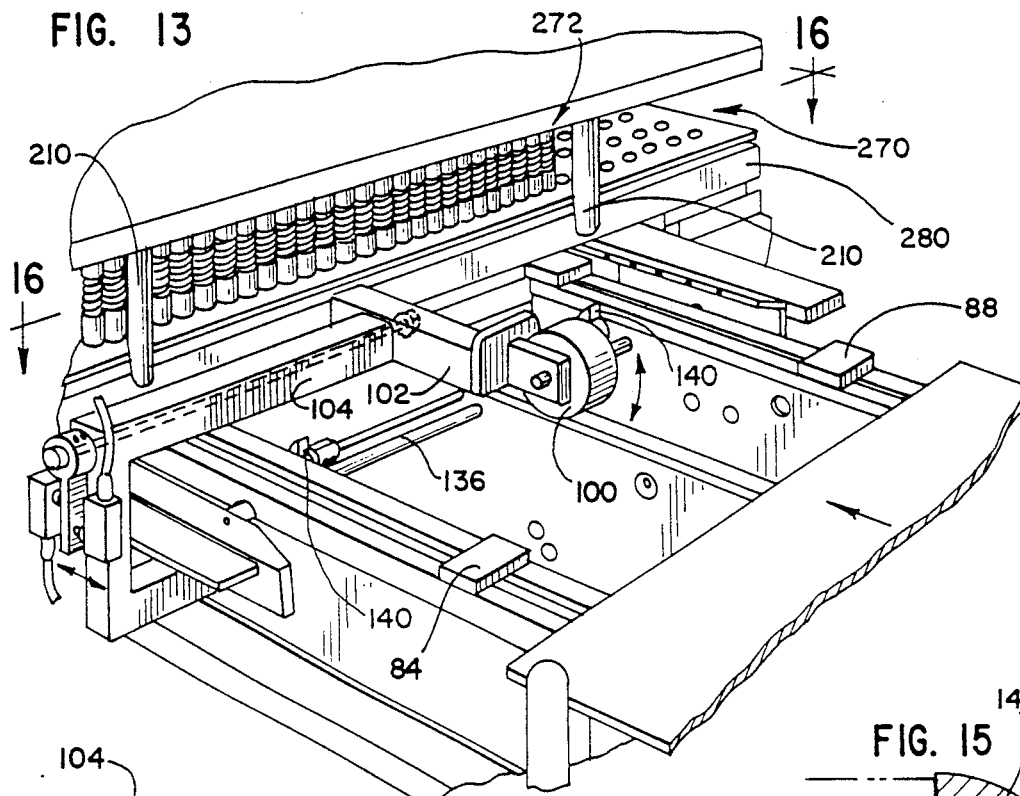
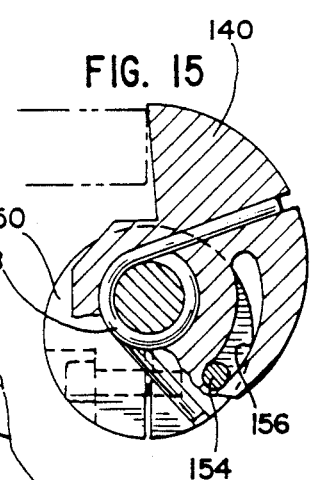
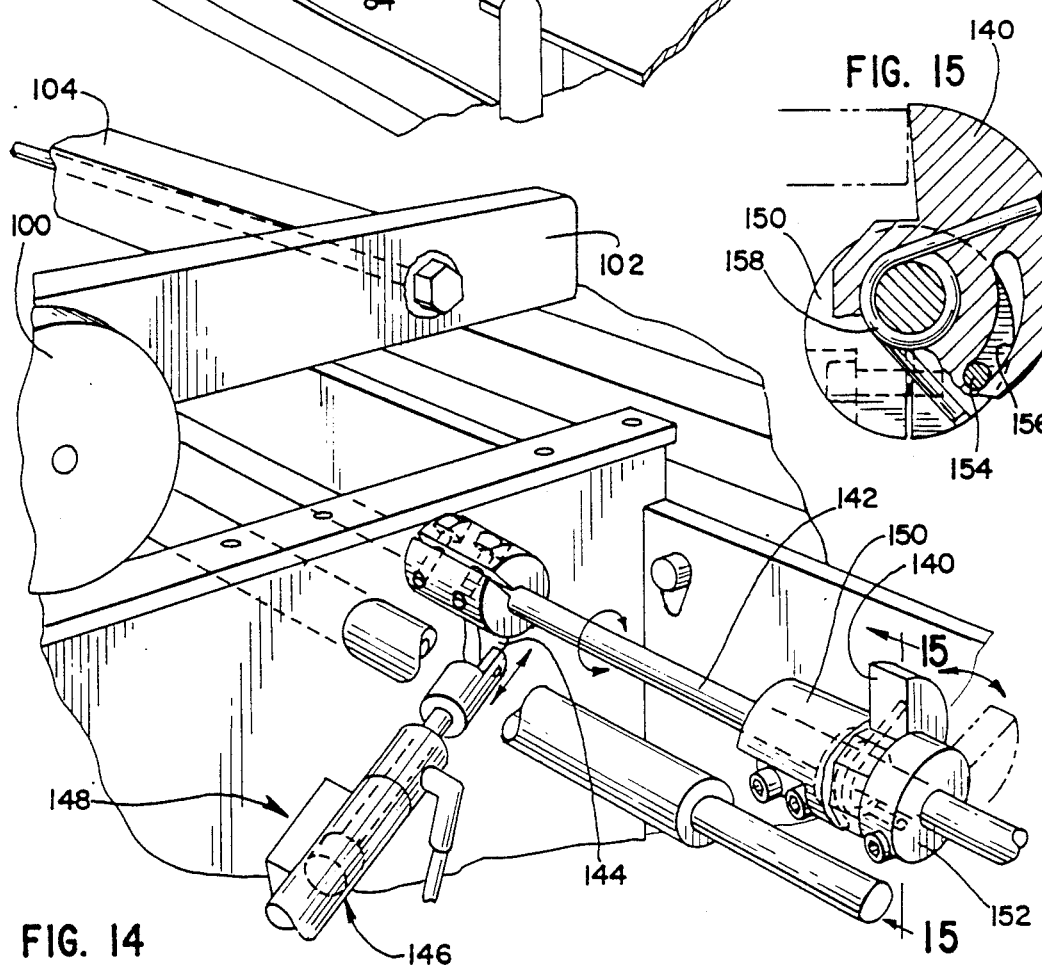

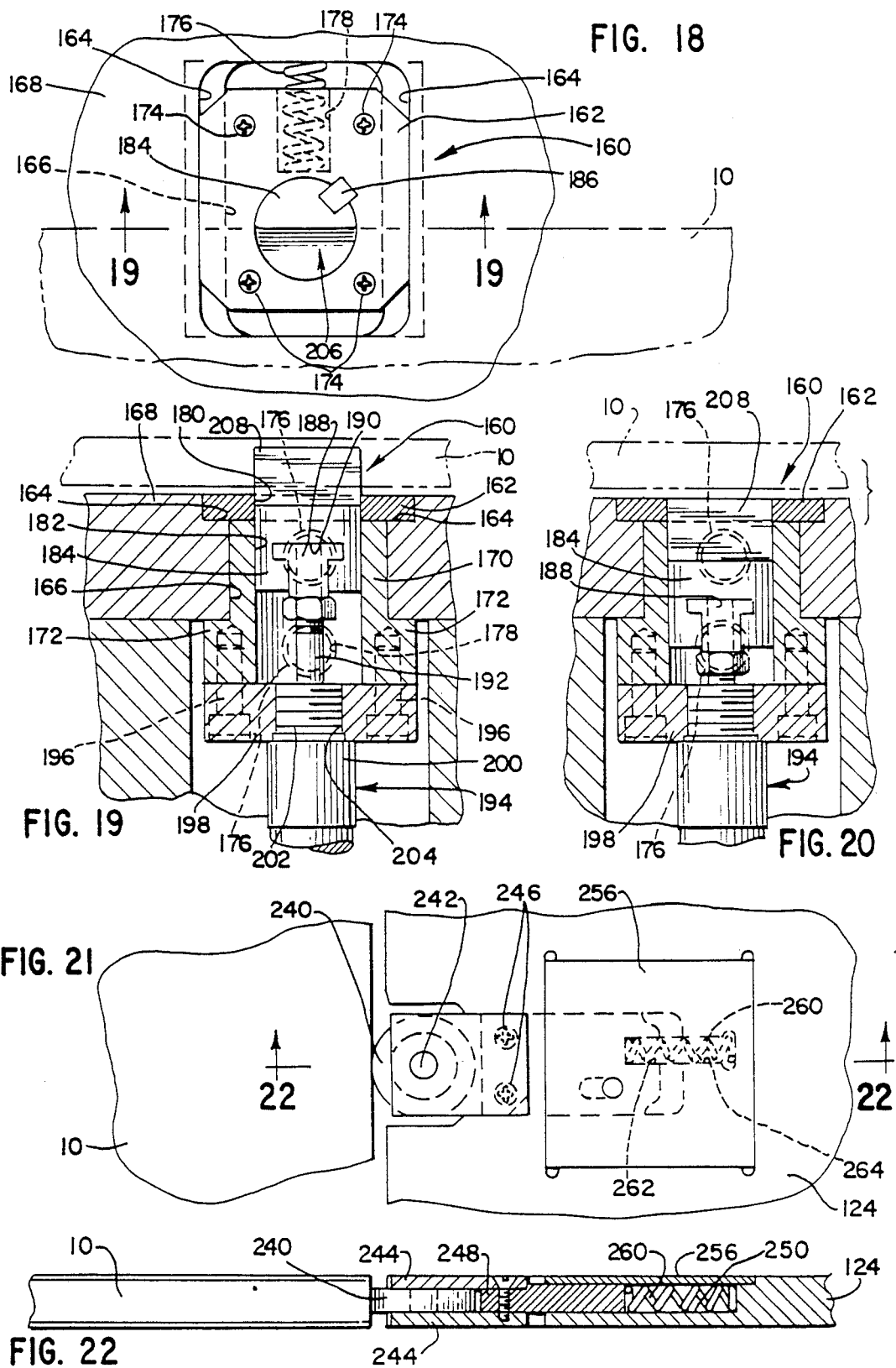

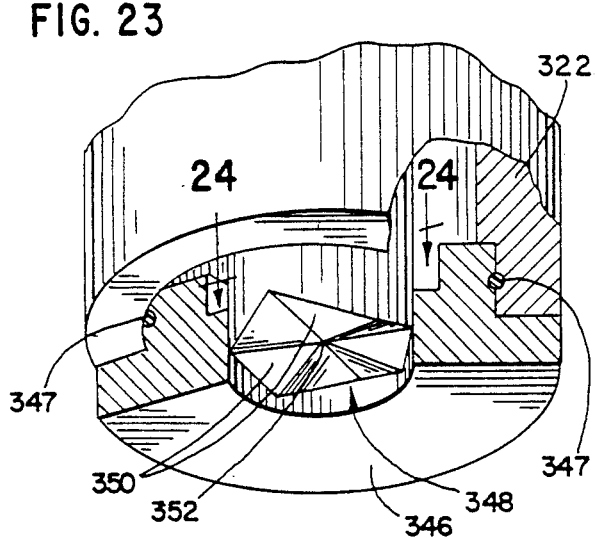
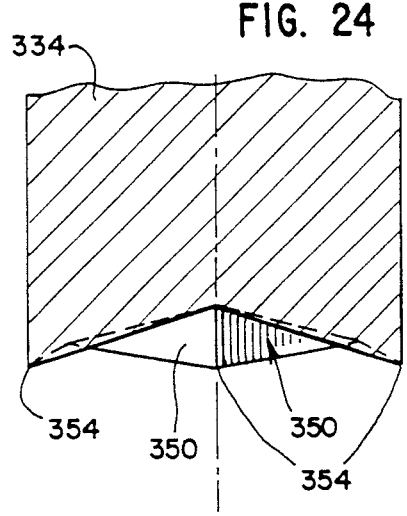
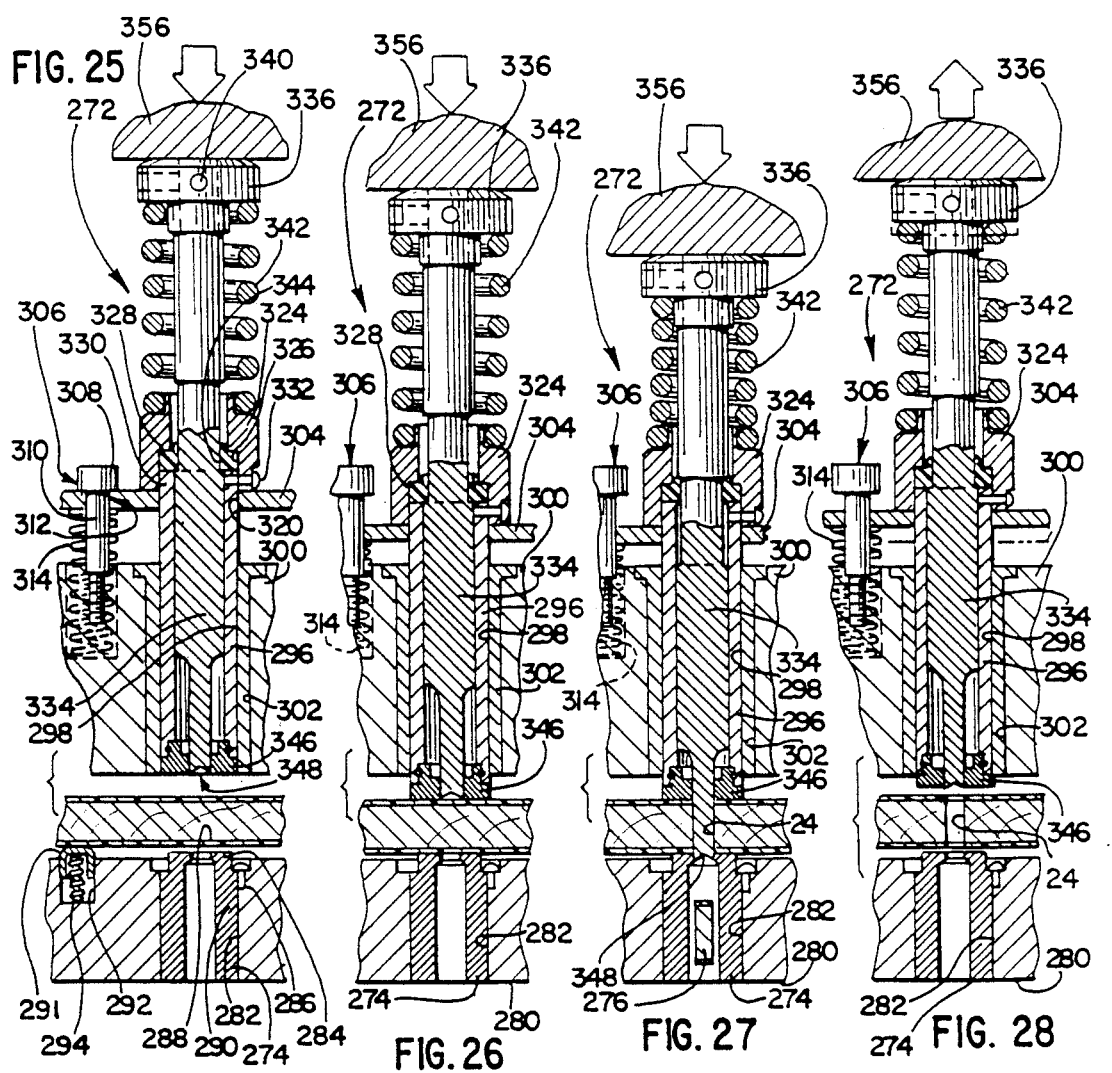

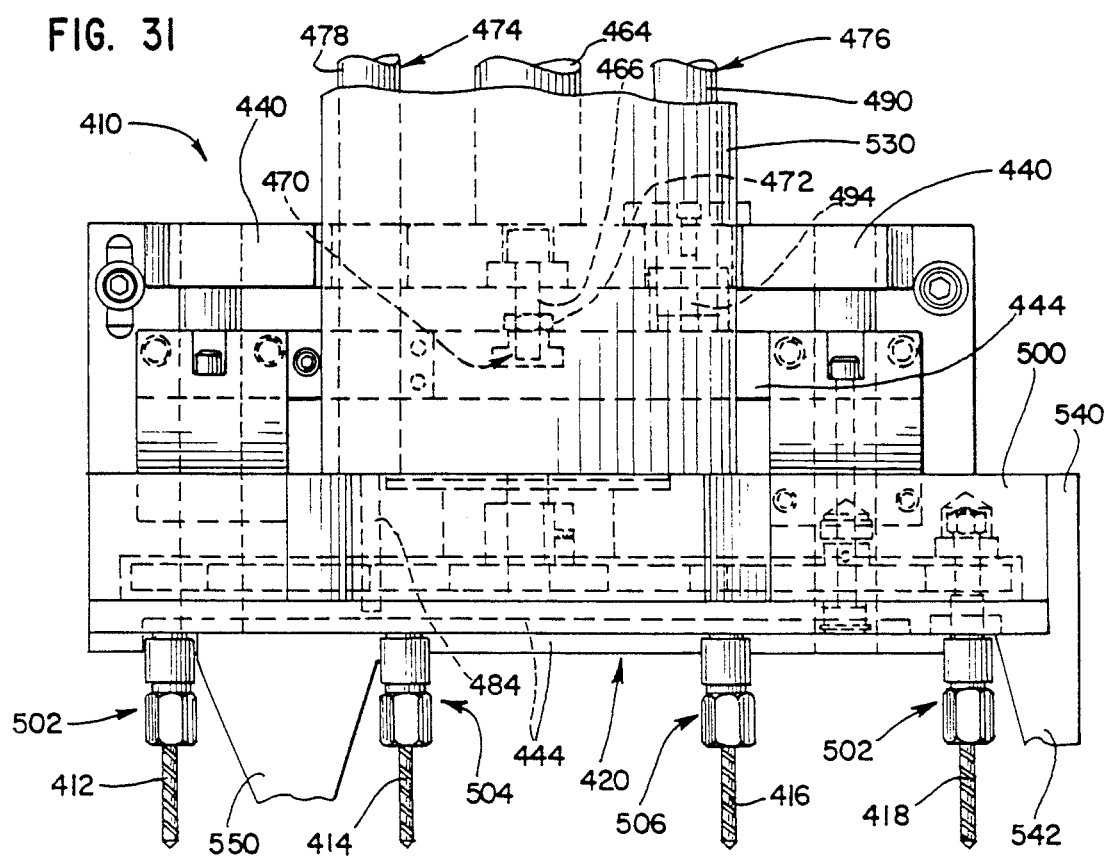
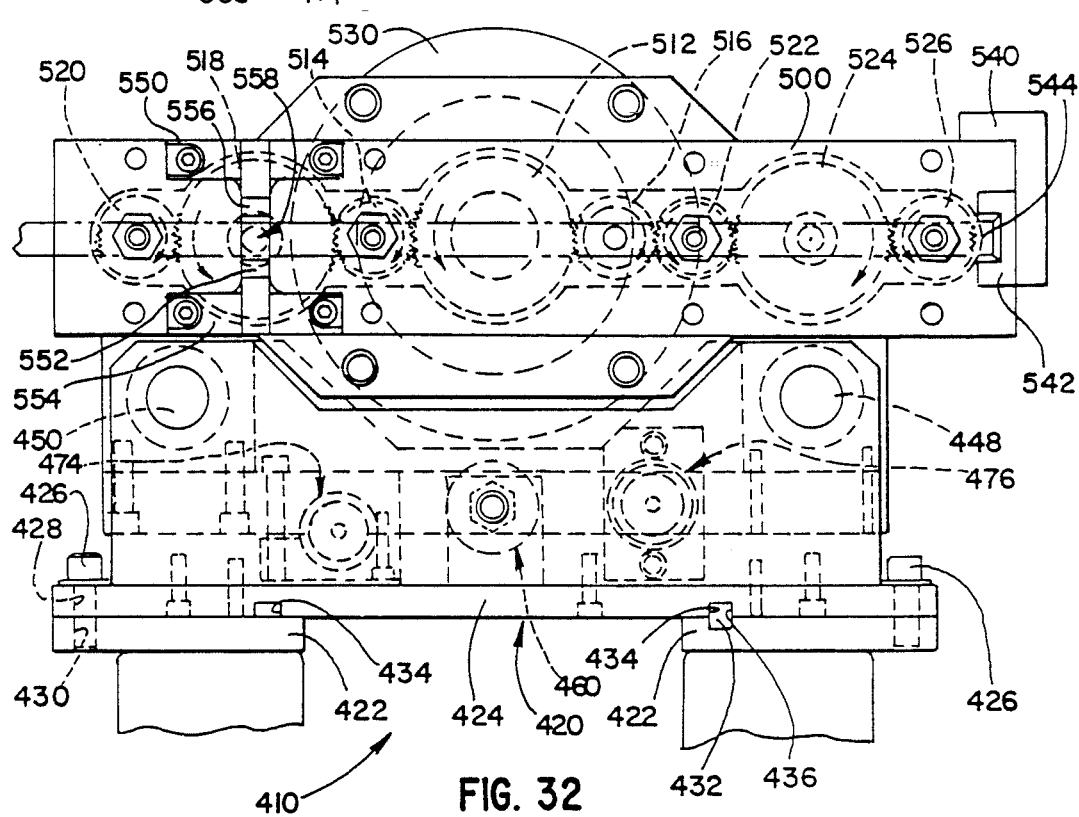

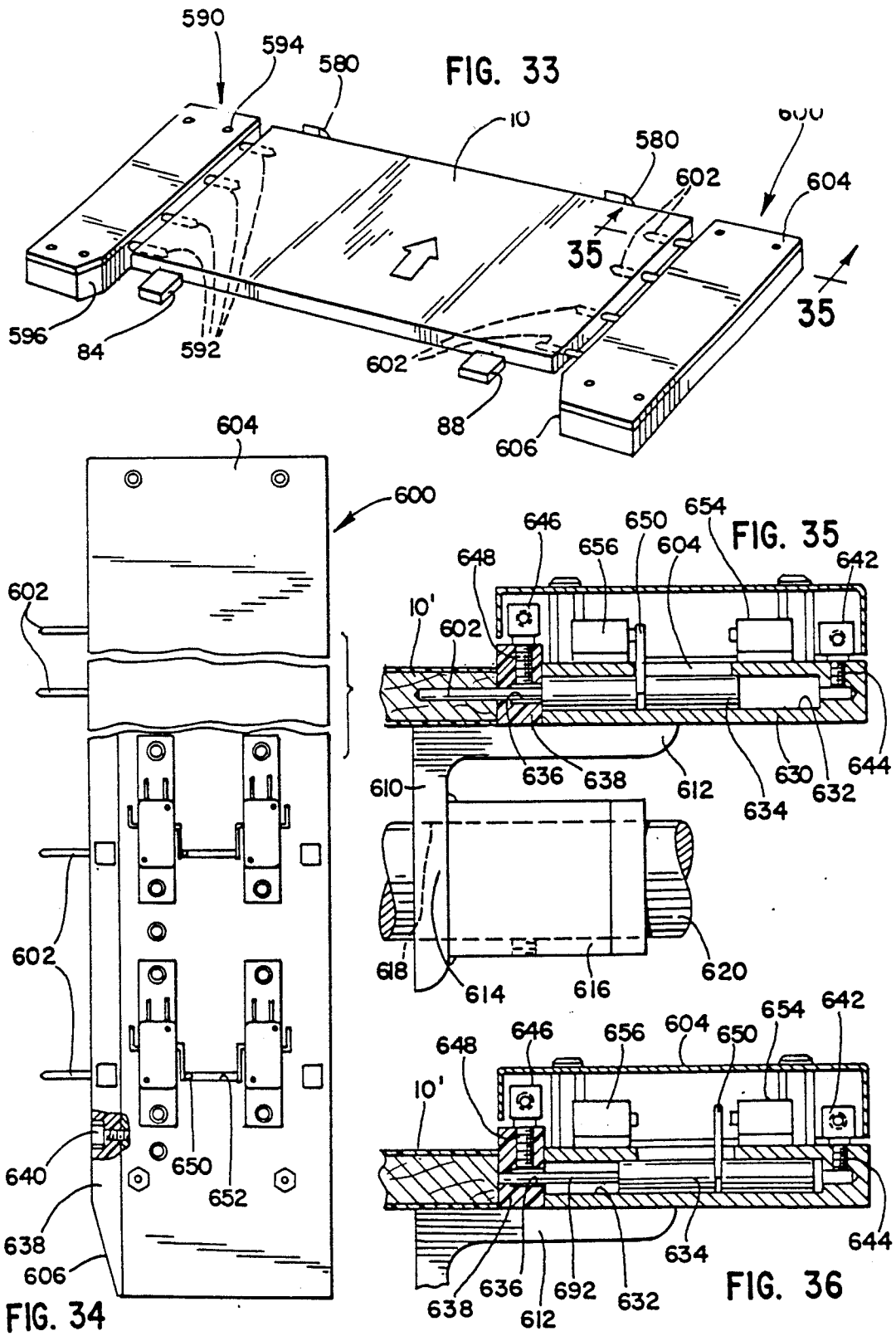

BOARD CONVEYOR

CROSS-REFERENCE TO RELATED APPLICATION

This application is a continuation-in-part of copending U.S. patent application Ser. No. 07/476,177 entitled "METHOD AND APPARATUS FOR FORMING HOLES IN WOOD BOARD OR THE LIKE", filed Feb. 7, 1990, by Mark H. Becker, and assigned commonly herewith. The disclosure of said copending application, of which this application is a continuation-in-part, is incorporated herein by reference.

TECHNICAL FIELD OF THE INVENTION

This invention pertains to a conveyor for conveying a board into a zone, such as a zone where holes are punched through the board, where holes are drilled into one or both of its opposite ends, or where the board is worked otherwise, in which it is desired to register the board in a longitudinal sense.

BACKGROUND OF THE INVENTION

The copending application noted above discloses a method and apparatus for forming holes in a board made predominately of wood, wood byproducts, or like material, whereby one or more holes are punched through the board, one or more holes may be also drilled into one or both of its opposite ends, and the drilled holes may be then inspected.

As disclosed in the copending application noted above, each board is conveyed successively into a punching zone, from the punching zone into a drilling zone, and from the drilling zone into an inspecting zone. In each of the punching, drilling, and inspecting zones, it is desired to register the board in a longitudinal sense.

SUMMARY OF THE INVENTION

This invention provides a conveyor for conveying a board into a zone, such as one of the punching, drilling, and inspecting zones noted above, wherein it is desired to register the board in a longitudinal sense.

Broadly, the conveyor comprises a mechanism for conveying the board along a longitudinal path, into the zone, and a mechanism for registering the board in the zone, in a longitudinal sense.

The registering mechanism comprises at least one board-registering element arranged to be normally removed from the longitudinal path and to be selectively insertable into the longitudinal path, ahead of the board, so that the board-registering element can engage the board when inserted into the longitudinal path. The board-registering element is biased so as to urge the board backwardly when inserted into the longitudinal path. Different arrangements are contemplated by this invention.

In a first arrangement contemplated by this invention, the registering mechanism comprises two such board-registering elements spaced transversely from each other and arranged to be vertically insertable into the longitudinal path, either from respective positions above the longitudinal path or from respective positions below the longitudinal path.

When such elements are arranged to be vertically insertable from respective positions above the longitudinal path, such elements may be pivotally biased so as to bias the board backwardly when inserted into the longitudinal path. Thus, as an example, the board-registering elements may comprise two spaced, generally vertical bars, which are arranged to be vertically insertable into the longitudinal path from respective positions above the longitudinal path, and which are pivotally biased so as to urge the board backwardly when inserted into the longitudinal path.

When such elements are arranged to be vertically insertable from respective positions below the longitudinal path, such elements may be longitudinally biased so as to bias the board backwardly when inserted into the longitudinal path. Thus, as an example, the board-registering elements may comprise two spaced, vertically retractable, longitudinally biased devices, each device being arranged to be vertically positionable between an operative position, in which such device is positioned to urge the board backwardly, and an inoperative position, in which such device is withdrawn beneath the longitudinal path.

In a second arrangement contemplated by this invention, the registering mechanism comprises two such board-registering elements spaced transversely from each other and arranged to be rotatably insertable into the longitudinal path, preferably from respective positions below the longitudinal path.

In the second arrangement noted above, such elements may be rotatably biased so as to bias the board backwardly when inserted into the longitudinal path. Thus, as an example, the board-registering elements may comprise two detents arranged to be conjointly rotatable between an operative position, in which the detents extend into the longitudinal path, and an inoperative position, in which the detents are withdrawn beneath the longitudinal path.

These and other objects, features, and advantages of this invention are evident from the following description of various embodiments of this invention, as incorporated in the apparatus disclosed in the copending application noted above, with reference to the accompanying drawings.

BRIEF DESCRIPTION OF THE DRAWINGS

FIG. 1 is a plan view of a relatively narrow, relatively short board formed with holes punched through its expansive faces, and with holes drilled into its opposite ends, such punched and drilled holes having been formed by an improved method according to this invention.

FIG. 2 is an end view of the board shown in FIG. 1.

FIG. 3 is a plan view of a relatively wide, relatively long board formed similarly with punched holes and drilled holes.

FIG. 4 is an end view of the board shown in FIG. 2.

FIG. 8 is an elevational view of the same apparatus.

FIG. 9 is an enlarged, fragmentary, elevational detail of certain elements shown in FIG. 8.

FIG. 10 is an overall, perspective view of the same apparatus, except for some elements that have been removed.

FIGS. 11 and 12 respectively are enlarged, fragmentary, perspective details of certain elements of the same apparatus.

FIG. 13 is a fragmentary, perspective view of the same apparatus as taken at its inlet end.

FIG. 14 is an enlarged, fragmentary, perspective view of the same apparatus, as taken from a different vantage.

FIG. 15 is a further enlarged, cross-sectional view taken along line 15—15 in FIG. 14, in a direction indicated by arrows.

FIG. 16 shows a relatively narrow, relatively short board being registered in a punching zone.

FIG. 18 is an enlarged, plan view of an exemplary one of two board-registering means shown in FIG. 16.

FIG. 19 is a fragmentary, sectional view taken along line 19—19 of FIG. 18, in a direction indicated by arrows. FIG. 20 is a similar view showing the board-registering means of FIGS. 18 and 19 in a changed position.

FIG. 21 is an enlarged, plan view of an exemplary one of three board-registering means shown in FIGS. 16 and 17.

FIG. 22 is a fragmentary, cross-sectional view taken along line 22—22 of FIG. 21, in a direction indicated by arrows.

FIG. 23 is a fragmentary perspective view of the working end of an exemplary punch used in the same apparatus.

FIG. 24 is a fragmentary, sectional view taken through line 24—24 of FIG. 23, in a direction directed by arrows.

FIGS. 25, 26, 27, and 28 respectively are fragmentary, cross-sectional views taken axially along such a punch and a die coacting therewith, at successive stages in their coaction.

FIG. 33 is a fragmentary, perspective detail showing means provided in the same apparatus for conducting a physical measurement of the holes drilled into such a board, by inserting a probe into each drilled hole.

FIG. 34 is a plan view of one of the means shown in FIG. 33 with a cover partly broken away so as to reveal interior details.

FIGS. 35 and 36 are cross-sectional views taken along line 35—35 in FIG. 33, in a direction indicated by arrows, to show operation of different limit switches respectively when an exemplary probe has been inserted into a drilled hole to at least a minimum depth and when such probe cannot be even partially inserted into such a hole.

DETAILED DESCRIPTION OF PREFERRED EMBODIMENT

Figure 5:
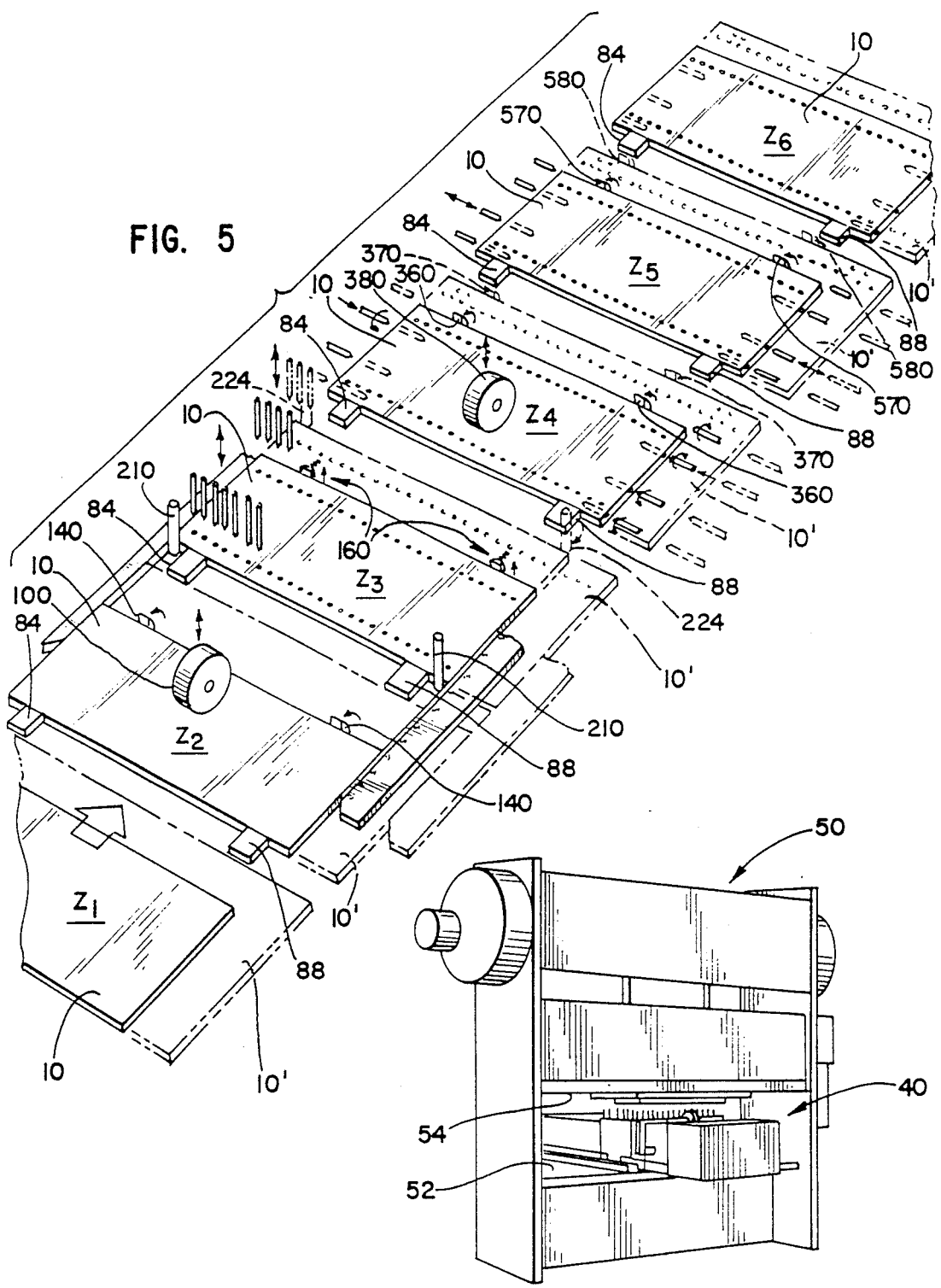
FIG. 5 is a diagrammatic, perspective view illustrating a series of automated steps contemplated by the improved method.

While this invention is susceptible to being embodied in various forms, there is shown in the drawings and will be hereinafter described a preferred embodiment, with the understanding that the present disclosure is to be considered as an exemplification of this invention and is not intended to limit this invention to any particular embodiment.

General Overview

A typical relatively narrow, relatively short board 10 is shown in FIGS. 1 and 2, as formed with holes by the improved method provided by this invention. The board 10 has two expansive faces 12, 14, which are rectangular, two transverse edges 16, 1 B, and two opposite ends 20, 22. The board 10 is made predominately of wood, wood byproducts, such as presswood or particle board, which is preferred, or like material. Preferably, the board 10 is covered on each of its expansive faces 12, 14, on each of its transverse edges 16, 18, and on each of its opposite ends 20, 22, with a polymeric veneer, such as a melamine veneer, which is preferred.

A typical relatively wide, relatively long board 10' is shown in FIGS. 3 and 4, as formed with holes by the same method. The board 10' is covered on each of its expansive faces 12', 14', on each of its transverse edges 16', 18', and on each of its opposite ends 20', 22', with a similar veneer.

Exemplary dimensions for each board 10 are a length ($L_1$) of about 32 inches, a width ($W_1$) of about 12 inches, and a thickness ($T_1$) of about 0.5 inch, 0.62 inch, or 0.75 inch, a thickness ($T_1$) of about 0.5 inch being preferred. Exemplary dimensions for each board 10' are a length ($L_2$) of about 42 inches, a width ($W_2$) of about 16 inches, and a thickness ($T_2$) of about 0.5 inch. The length of each board 10 or 10') can be varied so as to equal any length within a range of possible lengths, e.g., a range from about 32 inches to about 42 inches.

Each board 10 is formed, as shown, with two linear arrays of regularly spaced holes 24 (with 25 such holes 24 in each such array), which are punched through such board 10. Each punched hole 24 is punched through the expansive faces 12, 14, and extends in a direction perpendicular to the expansive faces 12, 14. The linear arrays of such holes 24 are parallel to each other and to the transverse edges 16, 18, as shown. Preferably, the punched holes 24 in each such array are spaced about 32 mm from center to center so as to conform to industry practice.

Each board 10' is formed, as shown, with two similar but longer arrays of punched holes 24' (with 34 such holes 24' in each such array) and with two pairs of punched holes 26' aligned with one another in a linear array parallel with the arrays of punched holes 24'. Each punched hole 24', 26', is punched through the expansive faces 14', and extends in a direction perpendicular to the expansive faces 12', 14'. The linear arrays of such holes 24', 26' are parallel to each other and to the transverse edges 16', 18', as shown. Preferably, the punched holes 24', 26, in each such array are spaced about 32 mm (1.26 inches) from center to center so as to conform to industry practice.

Two blind holes 28 are drilled into each of the opposite ends 20, 22, of each board 10. Each drilled hole 28 extends in a direction parallel to the expansive faces 12, 14, of such board 10.

Four blind holes 28' are drilled into each of the opposite ends 20', 22', of each board 10'. Each drilled hole 28' extends in a direction perpendicular to the expansive faces 12', 14', of such board 10'.

Such punched and drilled holes are formed in a series of such boards 10 (or 10') by a series of automated steps according to this invention, as illustrated diagrammatically in FIG. 5. In FIG. 5, six such relatively narrow, relatively short boards 10 are shown in full lines and six such relatively wide, relatively long boards 10' are shown in phantom lines—respectively in a loading zone $Z_1$, in a sensing zone $Z_2$, in a punching zone $Z_3$, in a drilling zone $Z_4$, in an inspecting zone $Z_5$, and in an unloading zone.

At the loading zone $Z_1$, each board 10 (or 10') is loaded manually onto a conveyor to be later described. The conveyor is used to index each board 10 (or 10') through the successive zones. Each board 10 (or 10') remains for a timed interval (dwell) in each of the sensing, punching, drilling, and inspecting zones. Such a board of a given size may be present in each of the successive zones, so long as such boards of different size are not intermixed in a given run.

In the sensing zone $Z_2$, into which each board (or 10') is conveyed from the loading zone $Z_1$, means to be later described are provided for sensing whether such board 10 (or 10') is present.

In the punching zone $Z_3$, into which each board 10 (or 10') is conveyed from the sensing zone $Z_2$, means to be later described are provided for registering such board 10 (or 10') in a longitudinal sense and in a transverse sense, in a predetermined position in the punching zone $Z_3$. Moreover, in the punching zone $Z_3$, means to be later described are provided for punching the holes 24 (or 24', 26') through such board 10 (or 10').

In the drilling zone $Z_4$, into which each board 10 (or 10') is conveyed from the punching zone $Z_3$, means to be later described are provided for sensing whether such board 10 (or 10') is present. Moreover, in the drilling zone $Z_4$, means to be later described are provided for drilling the plural holes 28 (or 28') into each of the opposite ends of such board 10 (or 10').

In the inspecting zone $Z_5$, into which each board 10 (or 10') is conveyed from the drilling zone $Z_4$, means to be later described are provided for conducting a physical measurement of each drilled hole 28 (or 28') so as to determine whether such drilled hole 28 (or 28') has been drilled to a minimum depth.

In the unloading zone $Z_6$, into which each board 10 (or 10') is conveyed from the inspecting zone $Z_5$, such board 10 (or 10') is unloaded manually.

Mechanical Features

Figure 6:
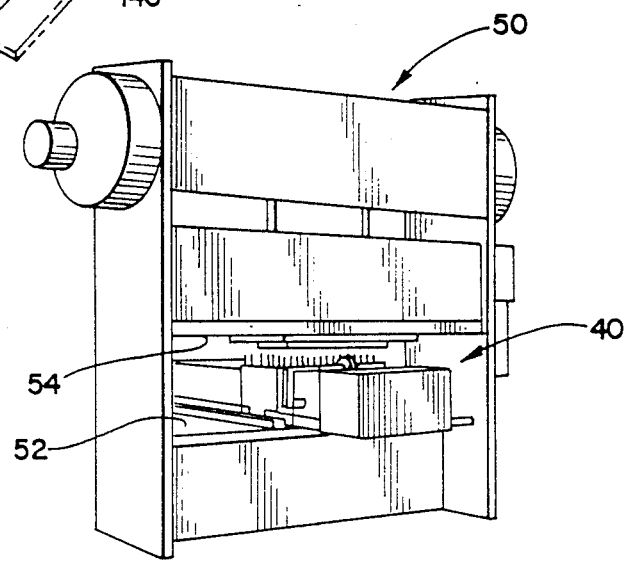
FIG. 6 is an overall, perspective view of an improved apparatus for practicing the improved method, in a preferred embodiment combined with a press comprising a pressing ram and a pressing bed.
Figure 7:
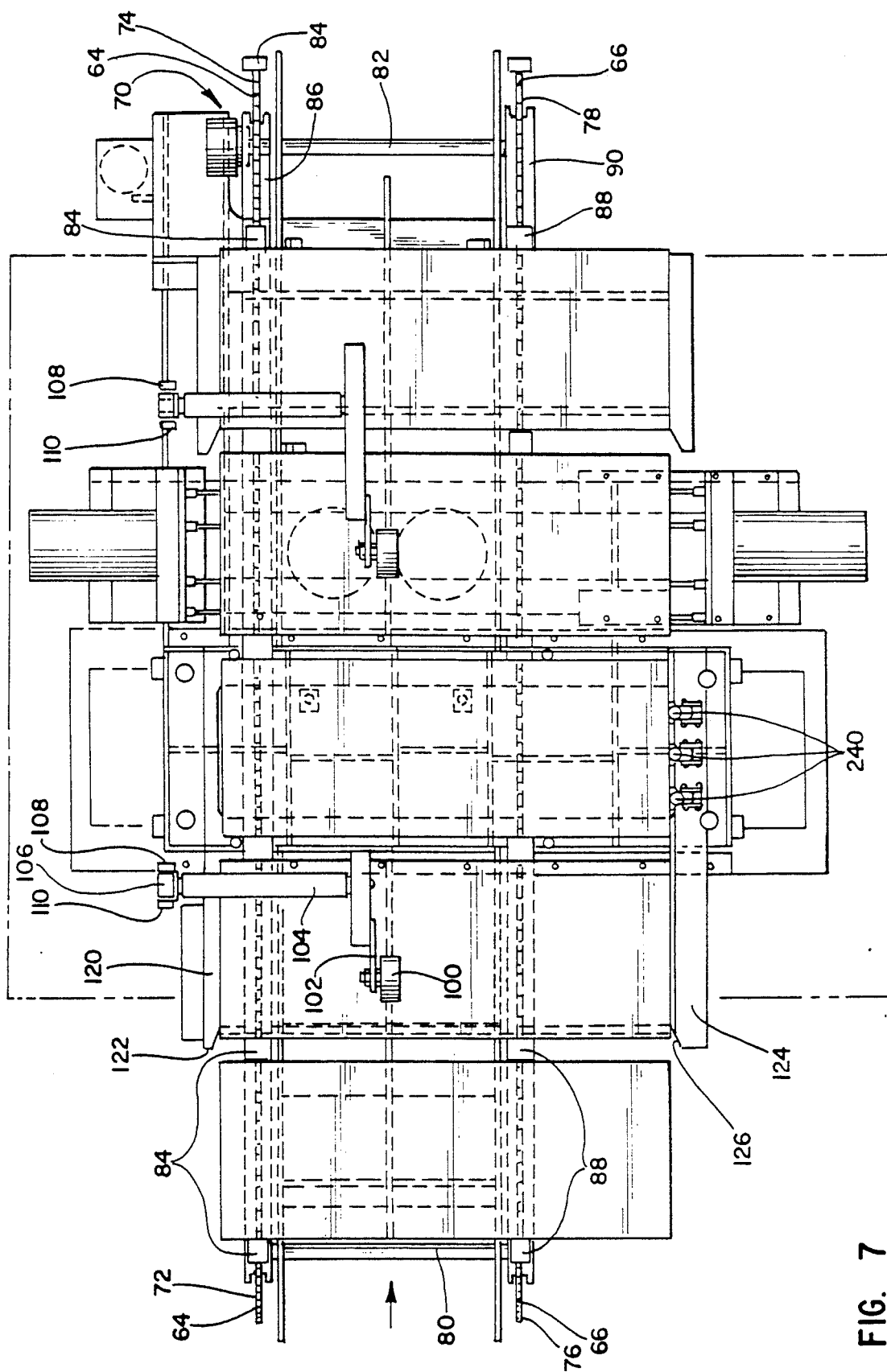
FIG. 7 is a plan view of the apparatus shown in FIG. 6.
Figure 16:
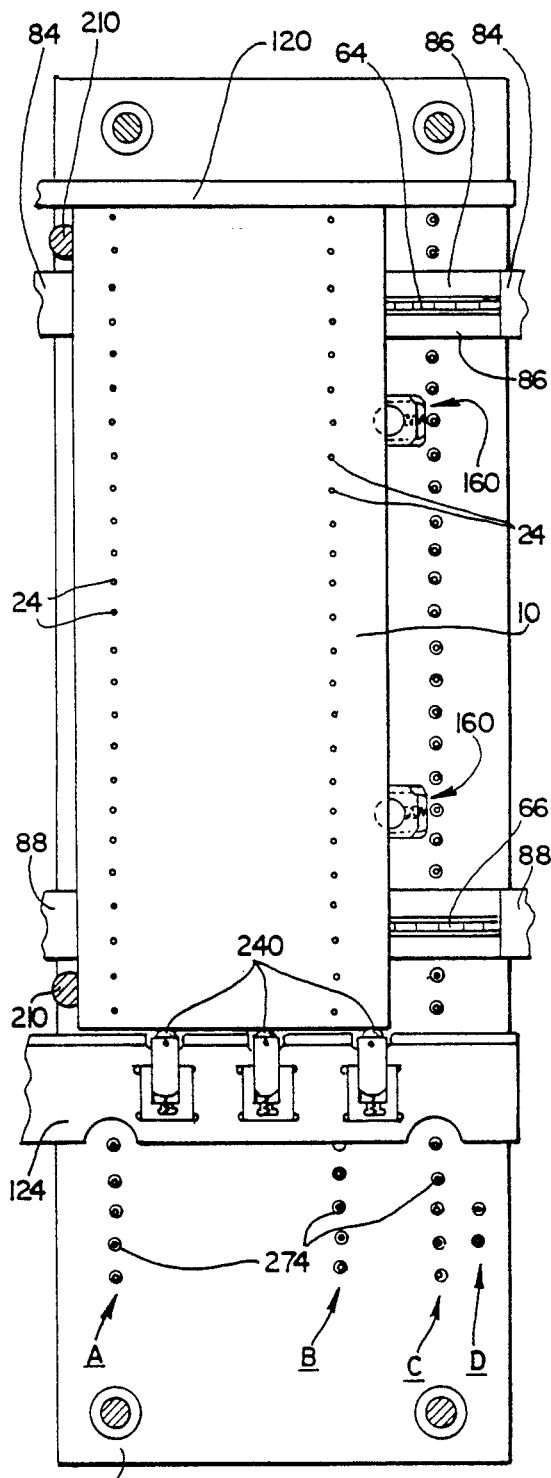
FIG. 16 is a fragmentary, sectional view taken along line 16—16 of FIG. 13, in a direction indicated by arrows.
Figure 17:
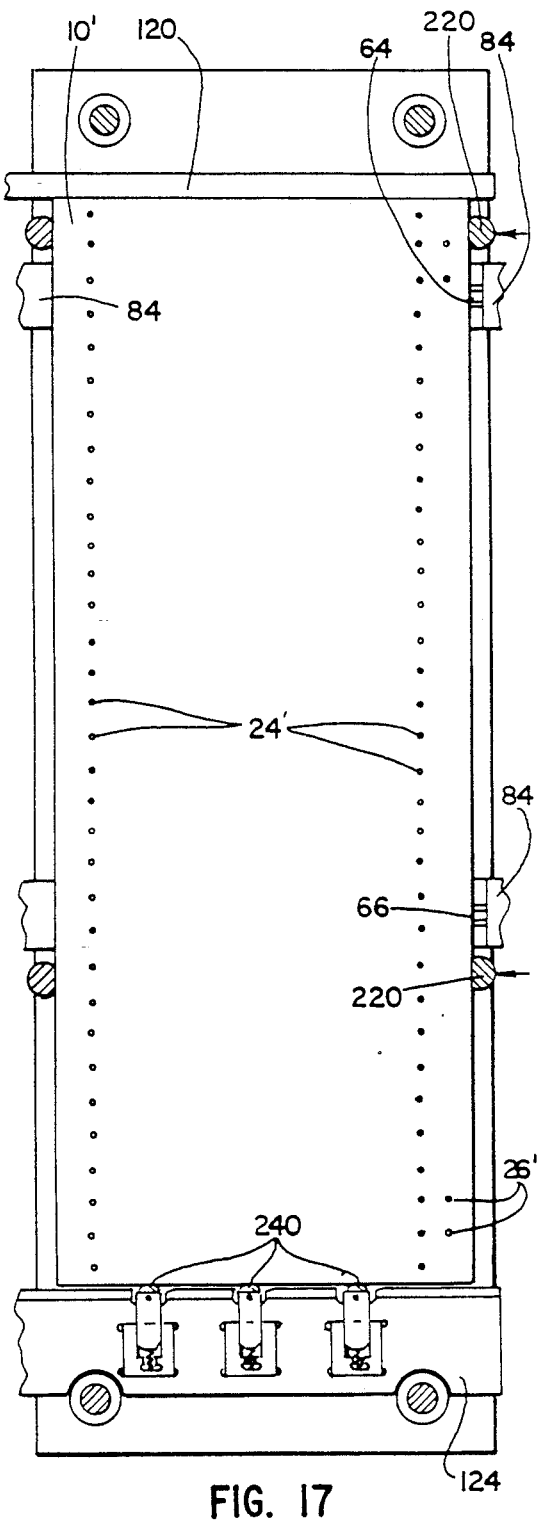
FIG. 17 is a similar view showing a relatively wide, relatively long board being registered in the punching zone.

The conveyor and other means noted above in a context of FIG. 5 are elements of an apparatus 40 constituting a preferred embodiment of this invention. The apparatus 40 can be easily set-up to accommodate, in a given run, a series of similar, relatively narrow boards, as exemplified by the boards 10, or a series of similar, relatively wide boards, as exemplified by the boards 10'. As shown in FIG. 6, the apparatus 40 is installed in a press 50 of a known type. Broadly, the press 50 comprises a pressing bed 52, a pressing ram 54, which is arranged to be downwardly driven toward the pressing bed 52 and to be upwardly retracted from the pressing bed 52, and mechanical means (not shown) for driving the pressing ram 54 downwardly and for retracting the pressing ram 54 upwardly.

A Niagra ™ (Model PN 150-108-30) punch press is suitable for the press 50 and is available commercially from Niagara Machine and Tool Works, Buffalo, N.Y. Details of its construction and its operation are known and, except as explained below, do not have to be explained herein.

The conveyor noted above, hereinafter the conveyor 60, is mounted operatively on a framework 62 of the apparatus 40 and comprises a pair of endless chains 64, 66, which are driven by an indexing drive 70 to be later described.

The chain 64 is deployed around and coacts with a pair of sprocket wheels 72, 74, respectively at the inlet and outlet ends of the apparatus 40. The chain 66 is deployed around and coacts with a pair of sprocket wheels 76, 78, respectively at the inlet and outlet ends of the apparatus 40. The sprocket wheel 72 for the chain 64 and the sprocket wheel 76 for the chain 66 are mounted on a common shaft 80, which is journalled to the framework 62, so as to be conjointly driven. The sprocket wheel 74 for the chain 64 and the sprocket wheel 78 for the chain 66 are mounted on a common shaft 82 which is journalled to the framework 62, and which is driven by the indexing drive 70, so as to be conjointly driven.

The chain 64 carries an endless series of driving pads 84, which are spaced from one another by a sufficient distance (about 18 inches) to permit one of the relatively wide boards 10' (with its leading and trailing edges oriented transversely) to fit between two such pads 84. The pads 84 are arranged to slide along a pair of rails 86, which are fixed to the framework 62 of the conveyor 60, when the chain 64 is driven. Each pad 84 is connected to the chain 64 by a link (not shown) between the rails 86.

The chain 66 carries an endless series of driving pads 88, which are similar to the pads 84, and which are spaced similarly so as to permit one of the relatively wide boards 10' (with its leading and trailing edges oriented transversely) to fit between two such pads 88. The pads 88 are arranged to slide along a pair of rails 90, which are fixed to the framework 62 of the conveyor 60, when the chain 66 is driven. Each pad 84 is connected to the chain 46 by a link (not shown) extending between the rails 90.

The pads 84 and the rails 86, as associated with the chain 64, and the pads 88 and the rails 90, as associated with the chain 66, are made from a rigid polymeric material, such as an acetal polymer, which tends to be inherently lubricious. When each board 10 (or 10') is conveyed by the conveyor 60, such board (10 or 10') with its leading and trailing edges oriented transversely is slidable along the rails 86, 90, and is driven by a trailing one of the pads 84 and a trailing one of the pads 88, as engaged with such board 10 (or 10') at its trailing edge.

In the loading zone $Z_1$, into which each board 10 (or 10') is conveyed from the loading zone $Z_1$, such board 10 (or 10') may be manually or automatically loaded onto the rails 86, 90, between two of the pads 84 and between two of the pads 88. Such board 10 (or 10') may be then conveyed by the conveyor 60 successively into the sensing zone $Z_2$, into the punching zone $Z_3$, into the drilling zone $Z_4$, into the inspecting zone $Z_5$, and into the unloading zone $Z_6$. Such board 10 (or 10') remains in each such zone for a timed interval (dwell).

Each board 10 (or 10') is sensed in the sensing zone $Z_2$ by a roller 100, which is arranged to engage such board 10 (or 10') at its leading edge, to roll onto such board 10 (or 10') and to roll upon such board 10 (or 10'), as such board 10 (or 10') is driven into the sensing zone $Z_2$. The roller 100 is journalled to a first arm 102 of a crank 104, which is journalled to the framework 62. The crank 104 has a second arm 106, which is deployed between two limit switches 108, 110. The roller 100 has sufficient weight to bias the crank 104 (which also is biased by a spring not shown) such that the second arm 106 actuates the limit switch 108 when no such board is present in the sensing zone $Z_2$. When the roller 100 is lifted by the leading edge of such a board 10 (or 10') the crank 104 is rotated such that the limit switch 108 no longer is actuated by the second arm 106. Neither of the limit switches 108, 110, is actuated by the second arm 106 if one such board is present in the sensing zone $Z_2$. However, if a stack of two or more such boards 10 (or 10') is engaged by the roller 100, or if one such board 10 (or 10') is lying on one or more of the pads 84, 88, when it is engaged by the roller 100, the crank 104 is rotated such that the second arm 106 engages the limit switch 110.

In the sensing zone $Z_2$, each board 10 (or 10') is registered in a transverse sense, in an approximately centered position, by being conveyed between a fixed rail 120, which has a beveled surface 122 at an inlet end of the sensing zone $Z_2$, and an adjustable rail 124, which has a similar beveled surface 126. The rail 120 is fixed to the framework 62. The rail 124 is mounted adjustably to the framework adjusted to accommodate the nominal length of each board 10 (or 10') being handled by the apparatus 40 in a given run. The beveled surface 122 or the beveled surface 126 cams each board 10 (or 10') to an approximately centered position between the rails 120, 124, if such board 10 (or 10') is displaced transversely but not excessively when conveyed into the sensing zone $Z_3$.

The rail 124 is mounted fixedly on a structural angle 128, which has a transverse flange 130 supporting the rail 124 and a vertical flange 132, as shown in FIG. 8. Two sleeves 134 are welded to the vertical flange 132, each so as to be axially aligned with an aperture (not shown) in the vertical flange 132. Two transverse rods 136 are mounted fixedly to the framework 62. One of the transverse rods 136 passes through each sleeve 134, and through the associated aperture through the vertical flange 132, such that the rail 124 is mounted adjustably on the transverse rods 136. Each sleeve 134 is positioned on the transverse rod 136 passing through such sleeve 134 by a detent (not shown) carried by such sleeve 134 and coacting with a recess (not shown) in such rod 136. Clamping means (not shown) of a known type are used to clamp such sleeve 134 to such rod 136.

In the sensing zone $Z_2$, each relatively narrow board 10 is registered in a longitudinal sense, in an approximate position, by being engaged at its leading edge by two detents 140. The detents 140 are shown in FIGS. 10, 13, 14, and 15. The detents 140 are mounted on a common shaft 142, which is journalled to the framework 62, so as to be conjointly rotatable. The shaft 142 is linked via a crank 144 to a pneumatic piston-cylinder mechanism 146 equipped With a Hall-effect sensor 148. The piston-cylinder mechanism 146 is used to rotate the detents 140 between an inoperative position, in which the detents 140 are disposed below a plane comprising the upper surfaces of the rails 86, 90, and an operative position, in which the detents 140 extend above such plane so as to position the detents 140 to engage the leading edge of such board 10.

As shown in FIGS. 14 and 15, each detent 140 is mounted on the shaft 142, between two clamps 150, 152, so as to permit rotation of such detent 140 relative to the shaft 142 over a limited range of relative rotation. The limited range of relative rotation is defined by a pin 154 extending axially from the clamp 150 through an arcuate slot 156 in such detent 140. A coiled spring 158 is arranged, as shown, so as to bias such detent 140 in one rotational sense, namely the rotational sense causing such detent 140 to extend above the plane comprising the upper surfaces of the rails 86, 90, when such detent 140 is in its operative position. Thus, the coiled spring 158 enables such detent 140 to compensate for minor width variations from board to board.

As shown in FIG. 13, two spaced, vertical bars 210 are mounted rigidly to the pressing ram 54 so as to extend downwardly from the pressing ram 54, and so as to be conjointly movable upwardly and downwardly with the pressing ram 54. The vertical bars 210 have sufficient lengths that, when the pressing ram 54 is moved downwardly toward the pressing bed 52, the vertical bars 210 penetrate the plane comprising the upper surfaces of the rails 86, 90. However, their lengths are such that, when the pressing ram 54 is retracted upwardly, the vertical bars 210 are retracted sufficiently to permit a board 10 (or 10') to be then conveyed beneath the vertical bars 210 without interference from such bars 210.

In the punching zone $Z_3$, each board 10 (or 10') is registered in a longitudinal sense by means engaging such board 10 (or 10') at its leading edge and urging such board 10 (or 10') backwardly against the vertical bars 210, as the pressing ram 54 is moved downwardly such that the vertical bars 210 penetrate the plane comprising the upper surfaces of the rails 86, 90. Different means, as described below, are used for urging each relatively narrow board 10 in the punching zone $Z_3$ backwardly against the vertical bars 210 and for urging each relatively wide board 10' in the punching zone $Z_3$ backwardly against the vertical bars 210.

As shown in FIGS. 18, 19, and 20, two vertically retractable, spring-loaded devices 160 are used for urging each relatively narrow board 10 in the punching zone $Z_3$ backwardly against the vertical bars 210. Each device 160 is linked to a pneumatic piston-cylinder mechanism 194 so as to be vertically positionable between an operative position, in which such device 160 is positioned to urge each relatively narrow board 10 in the punching zone $Z_3$ backwardly against the vertical bars 210, and an inoperative position, in which such device 160 is withdrawn so as to permit each board 10 (or 10') to pass over such device 160. One such device 160 is shown in its operative position in FIGS. 18 and 19, in which such a relatively narrow board 10 is shown in phantom lines, and in which its inoperative position in FIG. 20, in the same board 10 again is shown in phantom lines.

Each device 160, as shown in FIGS. 18, 19, and 20, comprises a cross-slide 162, which is disposed in spaced notches 164 on opposite sides of a generally rectangular aperture 166 machined through a cross-piece 168, so as to be slidable in a longitudinal sense over a limited range of slidable motion. The cross-piece 168 is mounted rigidly to the framework 62. A block 170, which has a flange 172 at each side, is mounted beneath and to the cross-slide 162 by screws 174 so as to be conjointly slidable with the cross-slide 162. The flanges 172 extend beneath opposite sides of the aperture 166. Two springs 176, which are seated in respective sockets 178 in the block 170, bias the block 170 backwardly, as shown.

A cylindrical bore 180 defined vertically through the cross-slide 162 and a cylindrical bore 182 defined vertically through the block 170 communicate with each other, as shown, and receive a plunger 184, which is movable axially within the cylindrical bores 180, 182. The plunger 184 is keyed to the cylindrical bore 182 by a key 186, as shown, so as to be non-rotatable within the cylindrical bores 180, 182. The plunger 184 is linked by a T-shaped fitting 188, which coacts with a T-shaped socket 190 in the plunger 184, to the rod 192 of a pneumatic piston-cylinder mechanism 194, which is mounted beneath and to the block 170 by screws 196 passing through a mounting flange 198 attached to the nose 200 of such mechanism 194. A threaded neck 202 on the nose 200 is threaded into a threaded aperture 204 through the mounting flange 198. Thus, the cross-slide 162, the block 170, the plunger 184, and the piston-cylinder mechanism 194 are slidable conjointly and are biased backwardly by the springs 176, within the limited range of slidable motion of the cross-slide 162 in the notches 164.

The plunger 184 is formed with a notch 206 defining a wall 208 facing backwardly. The plunger 184, as linked to the piston-cylinder mechanism 194, is movable vertically between an operative position, in which the plunger 184 is elevated so as to engage the leading edge of each relatively narrow board 10 in the punching zone $Z_3$, at the wall 208, and an inoperative position, in which the plunger 184 is lowered so as to permit each board 10 (or 10') to pass over the plunger 184.

Because of the springs 176, which bias the plungers 184 of the respective devices 160 backwardly, such plungers 184 engage the leading edge of each relatively narrow board 10 in the punching zone $Z_3$, at the wall 208, so as to urge such board 10 backwardly against the vertical bars 210, which engage the trailing edge of such board 10.

As shown in FIG. 9 and elsewhere, two spaced, asymmetrical, T-shaped members 220 are mounted pivotally to the pressing ram 54, each being mounted at a pivot 222 defining a transverse axis, so as to be conjointly movable upwardly and downwardly with the pressing ram 54. Each member 220 has an upright leg 224 extending downwardly from the pivot 222, a relatively long leg 226 extending forwardly from the pivot 222, and a relatively short leg 228 extending backwardly from the pivot 222. A biasing device 230 of a conventional type comprising an internal spring 232 and an externally threaded sleeve 234 is mounted in a threaded aperture 236 in the forwardly extending leg 226, as shown, so as to bear upwardly against the pressing ram 54. An adjustable stop 238 is mounted on the backwardly extending leg 228, as shown, so as to point upwardly toward the pressing ram 54.

The biasing devices 230 bias the members 220 on the pivots 222, in a clockwise sense in FIG. 9, so as to cause the upright legs 224 to be backwardly pivoted. Also, the adjustable stops 238 limit pivotal movement of the upright legs 224, in a clockwise sense in FIG. 9. Thus, the upright legs 224 engage the leading edge of each relatively wide board 10' in the punching zone $Z_3$, as shown in FIG. 9, so as to urge such board 10' backwardly against the vertical bars 210, which engage the trailing edge of such board 10'.

In the punching zone $Z_3$, three spring-loaded rollers 240, as shown in FIGS. 7, 16, 17, 21, and 22, are used for urging each relatively short board 10 or each relatively long board 10' (whichever the rail 124 has been adjusted to accommodate) transversely against the fixed rail 120, by bearing against the adjacent end of such board, thereby to cause the fixed rail 120 to engage the opposite end of such board. One such roller 240 is shown as bearing against the adjacent end of such a relatively narrow board 10 in FIGS. 21 and 22.

Each spring-loaded roller 240, as shown in FIGS. 21 and 22, is journalled on a pin 242, between two spaced plates 244 fastened by screws 246 to a tongue 248, and is accommodated by a notch 250 in the rail 124. The tongue 248 fits into a groove defined by the notch 250 in the rail 124 and by a plate 256 covering the notch 254 and being fastened to such rail 124. A spring 260, which is disposed within a socket 262 notched into the tongue 248 and within a socket 264 notched into the rail 124, biases the roller 240 transversely, as shown, so as to urge each board 10 (or 10') against the fixed rail 120. The sockets 262, 264, are covered by the plate 256.

In the punching zone $Z_3$, a punching mechanism 270 is mounted operatively. Broadly, the punching mechanism 270 comprises a plurality of punch assemblies 272 and a plurality of dies 274, each punch assembly 272 defining an axis and coacting with one of the dies 274. Each punch assembly 272 and the die 274 coacting with such punch assembly 272 are used (depending on the set-up of the apparatus 40) to punch one of the holes 24 in each relatively narrow board 10 or to punch one of the holes 24' in each relatively wide board 10'. In FIGS. 25 through 28, one such punch assembly 272 and one such die 274 coacting with the same punch assembly 272 are shown as being used to punch one of the holes 24 in one of the relatively narrow boards 10 by removing a slug 276, which leaves such a hole 24.

The punching mechanism 270 comprises a die-mounting plate 280, which has a die-mounting aperture 282 at each location where one of the dies 274 is mountable. The die-mounting plate 280 is mounted fixedly to the framework 62 so as to rest firmly on the pressing bed 52. Each die-mounting aperture 282 is circular in cross-section. Each die 274 has an upper, annular shoulder 284, as shown, and is held in place by a button-head cap screw 286.

Each die 274 is shaped, as shown, so as to permit such die 274 to be installed in such an aperture 282 such that the upper portion 284 including a cutting edge 288 (which is circular) extends above the plate 280 by a slight distance and such that a lower portion 290 fits under the button-head cap screw 284. Each die 274 is made of hardened tool steel or other suitable material.

The die-mounting plate 280 has one die-mounting aperture 282 for each of the holes 24 to be possibly punched in a relatively narrow, relatively short board 10 and one such aperture 282 for each of the holes 24', 26', to be possibly punched in a relatively wide, relatively long board 10'.

Minimally, such a die 274 is installed in the die-mounting aperture 282 for each of the holes to be actually punched in each board, whether such a board 10 or such a board 10'. It is permissible but not necessary for such a die 274 to be also installed in each of the remaining apertures 282. The die-mounting plate 280 is mounted fixedly to the framework 62.

The die-mounting apertures 282 are arranged in several linear arrays, each corresponding to one of the previously described, linear arrays of punched holes. One linear array A of such apertures 282 near the trailing edge of a board in the punching zone $Z_3$ is used whether the board is a relatively narrow board 10 or a relatively wide board 10'. A selected one of two linear arrays B, C, of such apertures 282 near the leading edge of a board in the punching zone $Z_3$ also is used. Which one is used depends upon whether the board is a relatively narrow board 10 or a relatively wide board 10'. There is nothing to prevent all three arrays from being used. A different array D of such apertures 282 is used for each of the pairs of punched holes 26' of a relatively wide board 10'.

Plural spring-loaded rails 291 are used to elevate each board 10 (or 10') in the punching zone $Z_3$ above the upper portions 284 of the respective dies 274 by a slight distance but to permit such board 10 (or 10') to be downwardly pressed against the upper portions of the respective dies 274. One such rail 291 is shown in FIG. 25 as elevating a relatively narrow board 10. Each such rail 291 is fitted operatively into a slot 292 in the die-mounting plate 280 and is biased upwardly by a spring 294 in the slot 292. Each such rail 291 is beveled, as shown, so as to provide a smooth transition when engaged by the leading edge of each board 10 (or 10') being conveyed into the pressing zone $Z_3$.

The punching mechanism 270 comprises a bushing-holding plate 300, which is mounted fixedly to the framework 62, above and in spaced, parallel relation to the die-mounting plate 280. The bushing-holding plate 300 has a bushing-holding aperture 302 corresponding to and aligned axially with the annular shoulder 284 of each die-mounting aperture 282 of the die-mounting plate 280. Each bushing-holding aperture 302 holds and is lined by a bushing 296 defining a bushing-holding passageway 298, which is circular in cross-section. Each bushing 296 is secured by a button-head cap screw (not shown) removably to the bushing-holding plate 300.

The punching mechanism 270 also comprises a punch-lifting plate 304, which is supported above and in spaced, parallel relation to the bushing-holding plate 300. Plural shoulder screws for studs 306 having enlarged heads 308 and elongate shanks 310, which pass loosely through respective apertures 312 in the punch-lifting plate 304, and which are mounted fixedly to the bushing-holding plate 300, are used to assemble the bushing-holding plate 300 to the punch-lifting plates 304. Springs 314 are deployed in sockets (not shown) in the bushing-holding plate 300 so as to bear against the bushing-holding plate 300 and against the punch-lifting plate 304. As shown in FIGS. 25 through 28, in which one such stud 306 and one such spring 314 are shown, the springs 314 bias the punch-lifting plate 304 upwardly against the enlarged heads 308 of the studs 306, such heads 308 bearing against upper margins of the apertures 312. However, the springs 314 permit the punch-lifting plate 304 to be downwardly pressed toward the bushing-holding plate 300. The punch-lifting plate 304 has a punch-admitting aperture 320 corresponding to and being aligned axially with each bushing-holding aperture 302 of the bushing-holding plate 300.

Each punch assembly 272 comprises a bushing-holding sleeve 322 fitting slidably in a selected one of the punch-admitting apertures 320 and the corresponding one of the bushing-holding apertures 302. An upper, annular collar 324 having a lower, annular notch 326, which contains an punch-retaining ring 328 and receives an upper portion 330 of the sleeve 322, is fastened to such portion 330 of the sleeve 322 by a screw 332.

Each punch assembly 272 comprises a punch pin 334 having stepped diameters along its axial length, as shown, and extending axially through the collar 324, through the ring 328, and through the sleeve 322. An enlarged head 336 is attached to the upper end of the pin 334, by a set screw 340. A coiled spring 342 is deployed and is secured around the punch 334, between the collar 324 and the head 336, so as to bias the punch 334 upwardly within the sleeve 322. An annular shoulder 344 formed on the punch 334 engages the ring 328 contained by the notch 326 in the collar 324 so as to prevent the punch 334 from becoming disassociated from the collar 324, the ring 328, and the sleeve 322.

An annular member 346 made of a soft steel, such as AISI C 1018 steel, is affixed to the lower end of the sleeve 322 of each punch assembly 272, by an epoxy bead 347. The sleeve 322 serves to guide the punch 334. The annular member 346 serves to strip the panel 10 (or 10') from the punch 334.

The punch 334 is made of tool steel or similar material and has a specially shaped, hardened tip 348, as shown in FIGS. 23 and 24. The tip 348 has eight triangular facets 350 meeting at the axial center 352 of the pin 334 and forming four chisel points 354. Such points 354 tend to cut cleanly through the veneered faces of a panel 10 (or 10') being punched.

The enlarged heads 336 of the punching pins 334 of the respective punch assemblies 272 are disposed beneath rigid rails 356 (one shown) which are mounted rigidly beneath and to the pressing ram 54. One such rail 356 is provided for each linear array of such punch assembly 272. Thus, when the pressing ram 54 is driven downwardly toward the pressing bed 52 with a board elevated by the spring-loaded rails 291 between the die-mounting plate 280 and the bushing-holding plate 300, a punching sequence occurs, as shown in FIGS. 25 through 28, in which a board is shown.

As the pressing ram 54 is driven downwardly, the enlarged head 336 of the punch 334 of each punch assembly 272 is engaged by one of the rigid rails 356, as shown in FIG. 25. Next, such punch assembly 272, the spring 342 included in such punch assembly 272, and the bushing-holding sleeve 322 associated with such punch assembly 272 are driven downwardly. As such punch assembly 272, such spring 342, and such sleeve 322 are driven downwardly, the hardened tip 348 of such punch assembly 272 begins to penetrate the board 10 (or 10'). Also, such sleeve 322 is pressed downwardly against the board 10 (or 10') and the board 10 (or 10') is pressed downwardly against the upper portion 284 of the die 274 associated with such punch assembly 272, as shown in FIG. 27. Further movement of the pressing ram 54 downwardly drives the hardened tip 348 through the board 10 (or 10') whereby such tip 348 coacts with the cutting edge 288 of such die 274.

Upon subsequent retraction of the pressing ram 54 upwardly away from the pressing bed 52, the springs 342 included in the punch assemblies 272 drive the punches 334 upwardly through the sleeves 322 included in the punch assemblies 272, and the springs 314 drive the punch-lifting plate 304 upwardly, whereupon the punch-lifting plate 304 engages the collars 324 and drives the sleeves 322 as shown in FIG. 27. Thus, the punches 334 are stripped upwardly from the board 10, which engages the bushing-holding plate 300 if the board 10 is pulled upwardly with such sleeves 322.

Figure 29:
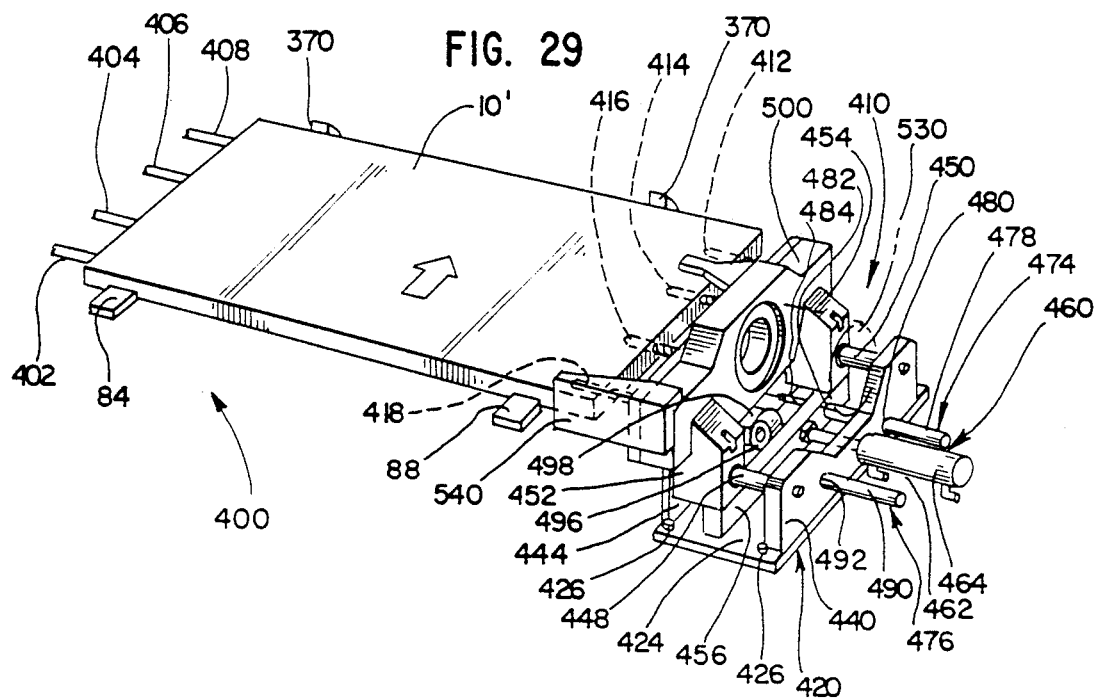
FIG. 29 is a fragmentary, perspective detail showing means provided in the same apparatus for drilling end holes into such a board. A motor of the drilling means is shown in phantom lines FIGS. 30, 31, and 32 respectively are end elevation, top plan, and side elevation views of the drilling means shown in FIG. 29. The motor of the drilling means is shown in full lines.
Figure 30:
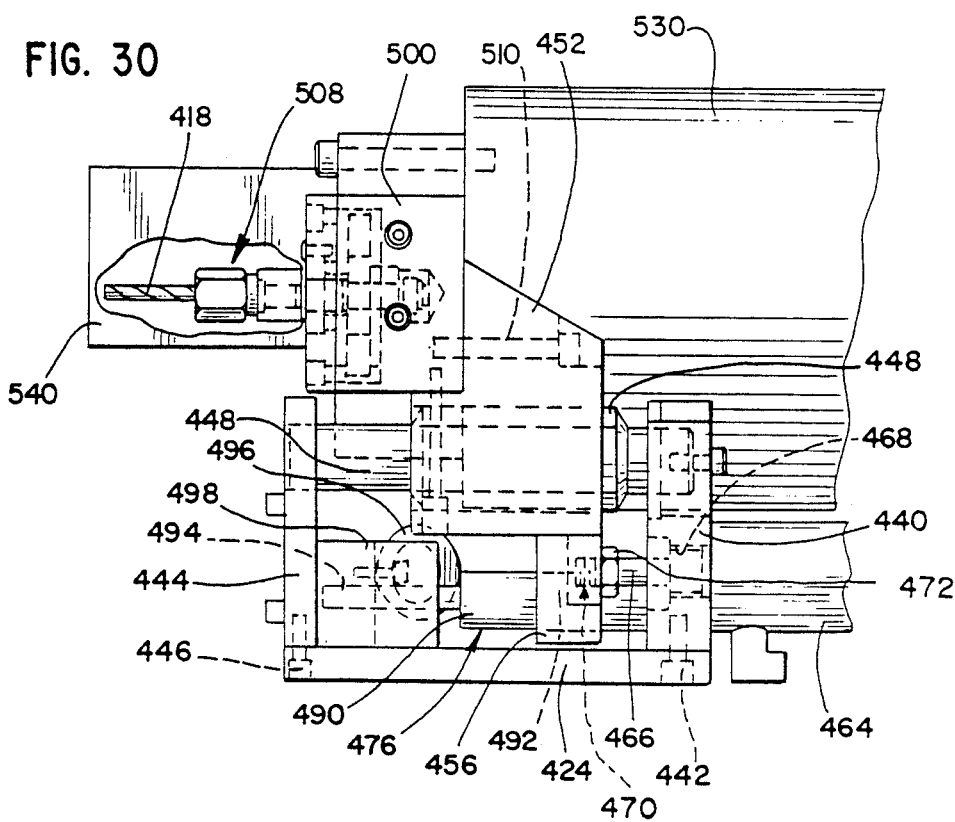

In the drilling zone $Z_4$, each relatively narrow board 10 is engaged at its leading edge by two detents 360, which are similar to the detents 140 in the sensing zone $Z_2$, and which operate similarly. Moreover, each relatively wide board 10' is engaged at its leading edge by two detents 370, which also are similar to the detents 140, and which also operate similarly. The detents 370 are displaced longitudinally from the detents 360 as shown in FIG. 10. If the detents 360 are actuated, the detents 370 are deactuated, and vice-versa. The detents 370 are shown in FIG. 29 as engaged with the leading edge of a relatively wide board 10'.

Each board 10 (or 10') in the drilling zone $Z_4$ is sensed by a roller 380, which is similar to the roller 100 in the sensing zone $Z_2$, and which operates similarly. The roller 380, via a crank 384 similar to the crank 104, coacts with two limit switches 388, 390, which are similar to the limit switches 108, 110, and which operate similarly.

In the drilling zone $Z_4$, a drilling assembly 400 equipped with as many as four ganged drilling bits 402, 404, 406, 408, is used (depending upon the set-up of the apparatus 40) to drill two holes 28 into the nearer end 20 of each relatively narrow board 10 or to drill, four holes 28' into the near end 20' of a relatively wide board 10'. Likewise, a drilling assembly 410 similar to the drilling assembly 400 and equipped with as many as four ganged drilling bits 412, 414, 416, 418, is used (depending upon the set-up of the apparatus 40) to drill two holes 28 into the nearer end 22 of a relatively narrow board 10 or four holes 28' into the nearer end 22' of a relatively narrow board 10'. The drilling assembly 410 equipped with such ganged drilling bits 412, 414, 416, 418, is shown in FIGS. 29 through 32. Also, a relatively wide board 10' (in which the punched holes are omitted to simplify illustration) is shown in FIG. 29, which also shows such ganged drilling bits 402, 404, 406, 408, of the drilling assembly 400.

The drilling assembly 410 comprises a rigid base 420, which is mounted adjustably to a pair of spaced mounting flanges 422. Such flanges 422 ar mounted fixedly to the framework 62. The base 420 comprises a lower plate 424, which is mounted adjustably on the mounting flanges 422 by cap screws 426 coacting with respective apertures 428 in the lower plate 424 and with respective apertures 430 in the mounting flanges 422. A sufficient number of such apertures 430 are provided in the flanges 422 to enable the plate 424 to be mounted at either of two possible positions on the flanges 422. A key 432, which fits into one of two keyways 434 provided in the plate 424 and into a keyway 436 in one of the flanges 422, permits transverse adjustment of the plate 424 along the flanges 422 when the screws 426 are loosened. The other keyway 434 is not used.

The base 420 comprises an outer wall 440, which is mounted rigidly to the plate 424 by machine screws 442, and an inner wall 444, which is mounted rigidly to the plate 424 by screws 446. Two transverse rods 448, 450, are mounted between and to the outer wall 440 and the inner wall 444. A guide block 452 is mounted slidably on the transverse rod 448. A guide block 454 is mounted slidably on the transverse rod 450. A lower brace 456 is mounted fixedly between and to such blocks 452, 454, so as to be conjointly slidable with sun blocks 452, 454.

A pneumatic piston-cylinder mechanism 460 equipped with a Hall-effect sensor 462 is provided, which has a cylinder 464 mounted fixedly to the outer wall 440, and which has a rod 466 extended from the cylinder 464, through an enlarged aperture 468 in such wall 440. The rod 466 is attached to the lower brace 456, at a threaded connection 470, which is secured by a threaded nut 472.

The pneumatic-piston cylinder mechanism 460 is arranged to push the lower brace 456 toward the inner wall 444 when the rod 466 is advanced from the cylinder 464 and to pull the lower brace 456 toward the outer wall 440 when the rod 466 is retracted into the cylinder 464. Two hydraulic devices 474, 476 are provided. The hydraulic device 474 includes a cylinder 478, which extends loosely through an aperture 480 in the outer wall 440, and which is mounted fixedly to the lower brace 456 so as to extend through an aperture 482 in the lower brace 456, and a rod 484, which is arranged to engage the inner wall 444 when the lower brace 456 is pushed toward the inner wall 444. The hydraulic device 474, which may be also called a constant velocity control, is used to control the pneumatic piston-cylinder mechanism 460, in a known manner, such that such mechanism 460 advances the piston 466 at a uniform velocity. The hydraulic device 476, which serves as a shock absorber, includes a cylinder 490, which is mounted fixedly to the outer wall 440 so as to extend through an aperture 492 in the outer wall 440, and a rod 494, which is arranged to engage the lower brace 456 when the lower brace 455 is pulled toward the outer wall 440. An annular elastomeric bumper 496 is mounted to a spacer 498, as shown, so as to provide further shock absorbency as the lower brace 456 is moved toward the inner wall 444.

A gear housing 500 comprising four drilling bit-mounting chucks 502, 504, 506, 508, is mounted to the guide blocks 452, 454, by screws 510. Each chuck is adapted to hold one of the drilling bits. As indicated by curved arrows in FIG. 31, the drilling bit 412 held by the chuck 502 and the drilling bit 414 held by the chuck 504 are left-hand bits, and the drilling bits 416 held by the chuck 506 and the drilling bit 418 held by the chucks 508 are right-hand bits.

Various gears including a driving gear 512 and other gears driven directly or indirectly by the driving gear 512 are mounted operatively in the gear housing 500, in which lower portions of such gears tend to be continuously immersed in lubricating oil. Two pinions 514, 516, are mounted so as to be driven by the driving gear 512. The pinion 514 is coaxial with the chuck 504. A larger gear 518 is mounted so as to be driven by the pinion 514. A pinion 520, which is coaxial with the chuck 502, is mounted so as to be driven by the larger gear 518. A pinion 522, which is coaxial with the chuck 506, is mounted so as to be driven by the pinion 516. A larger gear 524 is mounted so as to be driven by the pinion 522. A pinion 526, which is coaxial with the chuck 508, is mounted so as to be driven by the larger gear 524.

The pinion 520 is coupled to the chuck 502 such that the left-hand bit 412, if held by the chuck 502, is driven conjointly with the pinion gear 520. The pinion 514 is coupled to the chuck 504 such that the left-hand bit 414, if held by the chuck 504, is driven conjointly with the pinion gear 514. The pinion 522 is coupled to the chuck 506 such that the right-hand bit 416, if held by the chuck 506, is driven conjointly with the pinion 522. The pinion 526 is coupled to the chuck 508 such that the right-hand bit 418, if held by the chuck 508, is driven conjointly with the pinion 520.

An electric motor 530 is mounted to the gear housing 500 and is coupled to the driving gear 512 such that the electric motor 530 when actuated drives the driving gear 512. Thus, when the electric motor 530 is actuated, whichever drilling bits held by the chucks 502, 504, 506, 508, are driven. If two holes 28 are to be drilled into the nearer end 22 of a relatively narrow board 10, the drilling bits 414, 418, are installed respectively in the chucks 504, 508 but no drilling bits are installed in the chucks 502, 506. If four holes 28' are to be drilled into the nearer end 22' of a relatively wide board 10', as shown in FIG. 28, the drilling bits 412, 414, 416, 418, are installed respectively in the chucks 502, 504, 506, 508.

A board-registering member 540 is mounted fixedly to the gear housing 500. The board-registering member 540 has a channel portion 542, which is formed with a tapered groove 544, as shown in FIG. 32. When each board 10 (or 10') in the drilling zone $Z_4$ is engaged at its leading edge by the cams 360, the trailing edge of such board 10 (or 10') is urged backwardly into the tapered groove 544, whereby such board 10 (or 10') is registered in a longitudinal sense.

A board-stabilizing member 550 having a lower, tapered portion 552 and an upper, tapered portion 556 is mounted fixedly to the gear housing 500. The tapered portions 552, 556, define a tapered groove 558, as shown in FIG. 32. The tapered groove confines the nearer end 22 (or 22') of each board 10 (or 10') in the drilling zone $Z_4$ so as to stabilize (and locate vertically) the board 10 (or 10') as the holes 28 (or 28') are being drilled.

Each relatively narrow board 10 in the inspection zone $Z_5$, is engaged at its leading edge by two detents 570, which are similar to the detents 140 in the sensing zone $Z_2$, and which operate similarly. Each relatively wide board 10' in the inspecting zone $Z_5$ is engaged at its leading edge by two detents 580, which also are similar to the detents 140, and which also operate similarly. The detents 570 are displaced longitudinally from the detents 580, as shown in FIG. 10. If the detents 570 are actuated, the detents 580 are deactuated, and vice-versa. When the detents 570 are actuated, the detents 570 engage the leading edge of a relatively narrow board 10 so as to urge such board 10 backwardly against the driving blocks 84, 88, bearing against the trailing edge of such board 10, whereby such board 10 is registered in a longitudinal sense in the inspecting zone $Z_5$. When the detents 580 are actuated, the detents 580 engage the leading edge of a relatively wide board 10' so as to urge such board 10' backwardly against the driving blocks 84, 88, bearing against the trailing edge of such board 10', whereby such board 10' is registered in a longitudinal sense in the inspecting zone $Z_5$. The detents 580 are shown in FIG. 33 as engaging the leading edge of a relatively wide board 10' (with its punched holes omitted to simplify illustration) along with two driving blocks 84, 88, bearing against its trailing edge.

In the inspecting zone $Z_5$, an inspecting unit 590 equipped with four hole-inspecting probes 592 and provided with a removable cover 594 is used (depending upon the set-up of the apparatus 40) to perform a physical measurement of each of the two drilled holes 28 in the farther end 20 of a relatively narrow board 10 or to perform a physical measurement of each of the four drilled holes 28' in the farther end 20' of a relatively wide board 10'. The inspecting unit 590 and the removable cover 596 have beveled surfaces 596 at an inlet end of the inspecting zone $Z_5$. Moreover, an inspecting assembly 600 equipped with four hole-inspecting probes 602 and provided with a removable cover 604 is used (depending upon the set-up of the apparatus 40) to perform a physical measurement of each of the two drilled holes 28 in the nearer end 22 of a relatively narrow board 10 or to perform a physical measurement of each of the four drilled holes 28' in the nearer end 22' of a relatively wide board 10'. The inspecting assembly 600 and the removable cover 604 have beveled surfaces 606 at the inlet end of the inspecting zone $Z_5$.

The beveled surfaces 596 or the beveled surfaces 606 cam each board 10 (or 10') to an approximately centered position between the inspecting units 590, 600, if such board 10 (or 10') is displaced transversely but not excessively when conveyed into the inspecting zone $Z_5$.

The inspecting units 590, 600, are controllable (depending upon the set-up of the apparatus 40) such that none of the probes 592, 602, are advanced, such that two of the probes 592 and two of the probes 602 (such probes corresponding to the holes 28 drilled into each of the opposite ends 20, 22, of a relatively narrower board 10) are advanced, or such that all of the probes 592 and all of the probes 602 (such probes corresponding to the holes 28' drilled into each of the opposite ends 20', 22', of a relatively wide board 10') are advanced.

Except for where the beveled surfaces 596, 606, are located, the inspecting units 590, 600, are similar to each other. As shown in FIGS. 34, 35, and 36, the inspecting assembly 600 is to be next described in further detail.

The inspecting assembly 600 is mounted fixedly on a structural angle 610, which has a transverse flange 612 supporting the inspecting assembly 600 and a vertical flange 614. Two sleeves 616 are welded to the vertical flange 614, each so as to be axially aligned with an aperture 618 through the vertical flange 614. Two transverse rods 620, which are similar to the transverse rods 136, are mounted fixedly to the framework 62. One of the transverse rods 620 passes through each sleeve 616, and through the associated aperture 618 through the vertical flange 614, such that the inspecting assembly 600 is mounted adjustably on the transverse rods 620. Each sleeve 616 is positioned on the transverse rod 620 passing through such sleeve 616 by such a detent 622 carried by such sleeve 616 and coacting with a recess 624 in such rod 620. Clamping means 626 of a known type are used to clamp such sleeve 616 to such rod 620.

The inspecting assembly 600 comprises a lower base 630, which is bolted on the transverse flange 612 of the structural angle 610. The base 630 is bored so as to define four hollow cylinders 632, each hollow cylinder 632 corresponding to one of the probes 602 of the inspecting assembly 600. A piston 634, from which one of the probes 602 extends axially, is disposed operatively in each cylinder 632. Each probe 602 extends through an aperture 636 in an elongate strip 638 closing each cylinder 632 (where the base 630 is bored so as to define such cylinder 632) and being attached by recessed screws 640 (as shown) to the base 630. One of the beveled surfaces 606 is formed on the elongate strip 638, which is made of the polymeric material used for the blocks 84 and for the rails 86, such material tending to be inherently lubricious.

At each cylinder 632, a pneumatic fitting 642 is mounted to the base 630 at a threaded connection 644 so as to communicate with the outer end of such cylinder 632. Moreover, a pneumatic fitting 646 is mounted to the base 630 at a threaded connection 648 so as to communicate with the inner end of such cylinder 632.

A switch-actuating member 650 extends upwardly from each piston 634, through a slot 652 in the base 630. Two limit switches 654, 656, are associated with each member 650. The limit switches 654, 656, are mounted on the base 630. Each member 650 is arranged to actuate the limit switch 654 associated with such member 650 when the associated piston 634 is displaced within the associated cylinder 632 so as to reach the outer end of the associated cylinder 632. Such member 650 is arranged to actuate the limit switch 656 associated with such member 650 when the associated piston 634 is displaced within the associated cylinder 632 so as to reach the inner end of the associated cylinder 632.

Thus, as shown in FIGS. 35 and 36, if the inspecting assembly 600 is actuated so as to advance each probe 602, the member 650 associated with such probe 602 deactuates the associated limit switch 654. Thereupon, if such probe 602 is received by a drilled hole 28 (or 28') in a board 10 (or 10') to a sufficient minimum depth, the associated member 650 actuates the associated limit switch 656. However, no such hole is positioned to receive such probe 602, or if a hole positioned to receive such probe 602 does not receive such probe 602 to a sufficient minimum depth, the associated member 650 deactuates the associated limit switch 654 but does not actuate the associated limit switch 656.

As shown in FIGS. 11 and 12, the indexing drive 70 comprises a variable-speed, direct current motor 670, a high-speed clutch-brake combination 672 connected operatively to the motor 670, and a speed reducer 674 connected operatively to the clutch-brake 672. A Camco TM parallel series index drive available commercially from Emerson Power Transmission Corporation of Wheeling, Illinois, is suitable for the indexing drive 70.

Two timing cams 676, 678, are connected to the speed reducer 674 so as to be conjointly driven by the motor 670, via the clutch-brake 672. A cam follower 680 is arranged to follow the timing cam 676. A cam follower 682 is arranged to follow the timing cam 678.

As shown in FIGS. 8 and 10, the apparatus 40 is arranged to be rolled from an operative position (between the pressing ram 54 and the pressing bed 52) to an inoperative position (away from the pressing ram 54 and the pressing bed 52) so as to facilitate servicing and changes in the set-up of the apparatus 40. The framework 62 includes a lower plate 690, which is adapted to be firmly rested on the pressing bed 52. On each side of the framework 62, two grooved rollers 692 are mounted operatively, and an inverted V-shaped rail 694 is mounted in a U-shaped channel 696, which is mounted on a flat beam 698 mounted on the pressing bed 52, so as to extend longitudinally beneath the grooved rollers 692 on such side of the framework 62. Each flat beam 698 is supported by a vertical prop 700 at a distal end 702 of such beam 698.

Each rail 694 is arranged to be vertically movable between a lower position, in which such rail 694 and the associated channel 696 rest on the associated beam 698, and an upper position, in which such rail 694 is elevated so as to engage the associated rollers 692, and so as to support the apparatus 40 above and in spaced relation to the pressing bed 52. Thus, when each rail 694 has been moved to its upper position, the apparatus 40 may be then rolled between its operative and inoperative positions. At each end of each rail 694, a flange 704 is provided, which accommodates a jack screw 706 coacting with the associated beam 698. The jack screws 706 are used to move the rails 694 vertically between their lower and upper positions.

Electrical System

Details of the electrical system of the apparatus 40 may be found by reference to the copending application noted above.

Conclusion

A preferred embodiment has been described. Various modifications may be made therein without departing from the scope and spirit of this invention.

I claim:

1. A conveyor for conveying a board of a given width into a zone in which it is desired to register the board in a longitudinal sense, the conveyor comprising
   (a) means for conveying the board along a longitudinal path, into the zone, and
   (b) means for registering the board in he zone, in a longitudinal sense, the registering means comprising two board-registering elements arranged to be normally removed from the longitudinal path and to be selectively insertable into the longitudinal path, ahead of the board, so that the board-registering elements can engage the board when inserted into the longitudinal path, the board-registering element being biased so as to urge the board backwardly when inserted into the longitudinal path,
   wherein the board-registering elements are arranged to be rotatably insertable into the longitudinal path from respective positions below the longitudinal path.

2. The conveyor of claim 1 wherein the board-registering elements further comprise two generally vertical bars, which are arranged to be vertically insertable into the longitudinal path from respective positions above the longitudinal path, and which are pivotally biased so as to urge the board backwardly when inserted into the longitudinal path.

3. The conveyor of claim 1 wherein the board-registering elements further comprise two vertically retractable, longitudinally biased devices, each device being arranged to be vertically positionable between an operative position, in which such device is positioned to urge the board backwardly, and an inoperative position, in which such device is withdrawn beneath the longitudinal path.

4. The conveyor of claim 1 wherein the board-registering elements are rotatably biased so as to bias the board backwardly when inserted into the longitudinal path.

5. The conveyor of claim 1 wherein the board-registering elements comprise two detents arranged to be conjointly rotatable between an operative position, in which the detents extend into the longitudinal path, and an inoperative position, which the detents are withdrawn beneath the longitudinal path.

6. A conveyor for conveying a board of a given width into a zone in which it is desired to register the board in a longitudinal sense, the conveyor comprising
   (a) means for conveying the board along a longitudinal path, into the zone,
   (b) means for registering the board in the zone, in a longitudinal sense, the registering means comprising at least one board-registering element arranged to be normally removed from the longitudinal path, and to be selectively insertable into the longitudinal path, ahead of the board, so that the board-registering element can engage the board when inserted into the longitudinal path, the board-registering element being biased so as to urge the board backwardly when inserted into the longitudinal path,
   wherein the board-registering element is arranged to be rotatably insertable into the longitudinal path from a position below the longitudinal path.

7. The conveyor of claim 6 wherein the board-registering element is rotatably biased so as to bias the board backwardly when inserted into the longitudinal path.

* * * * *

UNITED STATES PATENT AND TRADEMARK OFFICE
CERTIFICATE OF CORRECTION

PATENT NO. : 5,064,048

DATED : November 12, 1991

INVENTOR(S) : Mark H. Becker

It is certified that error appears in the above-identified patent and that said Letters Patent is hereby corrected as shown below:

Col. 4, line 10, "1 B" should be --18--.

Col. 4, line 31, left parenthesis --(-- should be inserted before "or".

Col. 8, line 50, "which" should be deleted.

Col. 8, line 51, "which" should be inserted after "in".

Col. 11, line 9, "284" should be --286--.

Col. 11, line 36, "for" should be --or--.

Col. 11, line 62, "an" should be --a--.

Col. 13, line 35, "ar" should be --are--.

Col. 14, line 21, "455" should be --456--.

Col. 15, line 23, "inspection" should be --inspecting--.

UNITED STATES PATENT AND TRADEMARK OFFICE
CERTIFICATE OF CORRECTION

PATENT NO. : 5,064,048

DATED : November 12, 1991

INVENTOR(S) : Mark H. Becker

It is certified that error appears in the above-identified patent and that said Letters Patent is hereby corrected as shown below:

Col. 18, claim 1, line 11, "he" should be --the--.

Signed and Sealed this

Eighteenth Day of May, 1993

Attest:

MICHAEL K. KIRK

Attesting Officer

Acting Commissioner of Patents and Trademarks